United States Patent [19]
Kazarian

[11] Patent Number: 5,949,401
[45] Date of Patent: Sep. 7, 1999

[54] TWO-HANDED INPUT APPARATUS AND METHOD

[76] Inventor: Randal N. Kazarian, P.O. Box 40205, Santa Barbara, Calif. 93140

[21] Appl. No.: 08/754,680

[22] Filed: Nov. 21, 1996

[51] Int. Cl.$^6$ ..................................................... G09G 5/00
[52] U.S. Cl. .......................... 345/156; 345/163; 345/167; 345/168
[58] Field of Search .................................... 345/157, 156, 345/161, 163, 167, 168, 169; 361/680, 679, 683, 686; 463/37, 38; 364/709.11, 709.12; 341/20, 21, 22; 348/734; 248/289.11; 439/534, 527, 6, 8, 13, 27

[56] References Cited

U.S. PATENT DOCUMENTS

| | | | |
|---|---|---|---|
| 3,936,026 | 2/1976 | Hampel et al. | 248/349 |
| 4,424,947 | 1/1984 | Adams et al. | 244/134 |
| 4,458,238 | 7/1984 | Learn | 340/365 |
| 4,850,880 | 7/1989 | Zayat, Jr. et al. | 439/11 |
| 4,927,364 | 5/1990 | Inui et al. | 439/15 |
| 4,933,670 | 6/1990 | Wislocki | 340/709 |
| 4,952,919 | 8/1990 | Nippoldt | 340/710 |
| 5,063,289 | 11/1991 | Jasinski et al. | 250/221 |
| 5,063,376 | 11/1991 | Chang | 345/163 |
| 5,260,696 | 11/1993 | Maynard, Jr. | 345/163 |
| 5,280,276 | 1/1994 | Kwok | 345/167 |
| 5,287,090 | 2/1994 | Grant | 345/163 |
| 5,296,871 | 3/1994 | Paley | 345/163 |
| 5,298,919 | 3/1994 | Chang | 345/163 |
| 5,313,230 | 5/1994 | Venolia et al. | 345/163 |
| 5,334,997 | 8/1994 | Scallon | 345/167 |
| 5,339,097 | 8/1994 | Grant | 345/157 |
| 5,379,054 | 1/1995 | Tanaka et al. | 345/163 |
| 5,426,449 | 6/1995 | Danziger | 345/168 |
| 5,457,480 | 10/1995 | White | 345/163 |
| 5,512,892 | 4/1996 | Corballis et al. | 345/161 |
| 5,551,693 | 9/1996 | Goto et al. | 345/169 |
| 5,563,631 | 10/1996 | Masunaga | 345/161 |

OTHER PUBLICATIONS

National Aeronautics and Space Administration Contract No. NAS 7–918, Technical Support Package on Portable Computer Keyboard for Use With One Hand, Nov., 1992, NASA Tech Brief, vol. 16, No. 11, Item #44, from JPL New Technology Report NPO–18231/7740, Inventor G. Friedman.

*Primary Examiner*—Richard A. Hjerpe
*Assistant Examiner*—Ricardo Osorio
*Attorney, Agent, or Firm*—Leo F. Costello

[57] ABSTRACT

An apparatus and method for inputting data including controls to a computer, or other equipment. Included are a two-handed, hand-held apparatus and a method for inputting data using the apparatus. The apparatus includes a plurality of input devices, each having input elements for inputting data to a computer or other equipment by the transmission of signals to such computer or equipment, and a pair of holders that mount the input devices and have holding portions and hand resting portions. The holders are releasably joined in back-to-back relation by a connector mechanism that allows the holders to be individually held in free space by and between the two hands of a user. The apparatus can be used in any position but the preferred method of use involves turning or rotating the hands so that a selected input device is positioned on top in a convenient position for manipulation by the uppermost hand while it rests on the uppermost holder and while the entire apparatus is being supported by the lowermost hand. More specifically, the connector mechanism pivotally interconnects the holders and has features which enable the holders and their input devices to be separated from the apparatus so that they can be interchanged with other holders mounting different input devices.

32 Claims, 12 Drawing Sheets

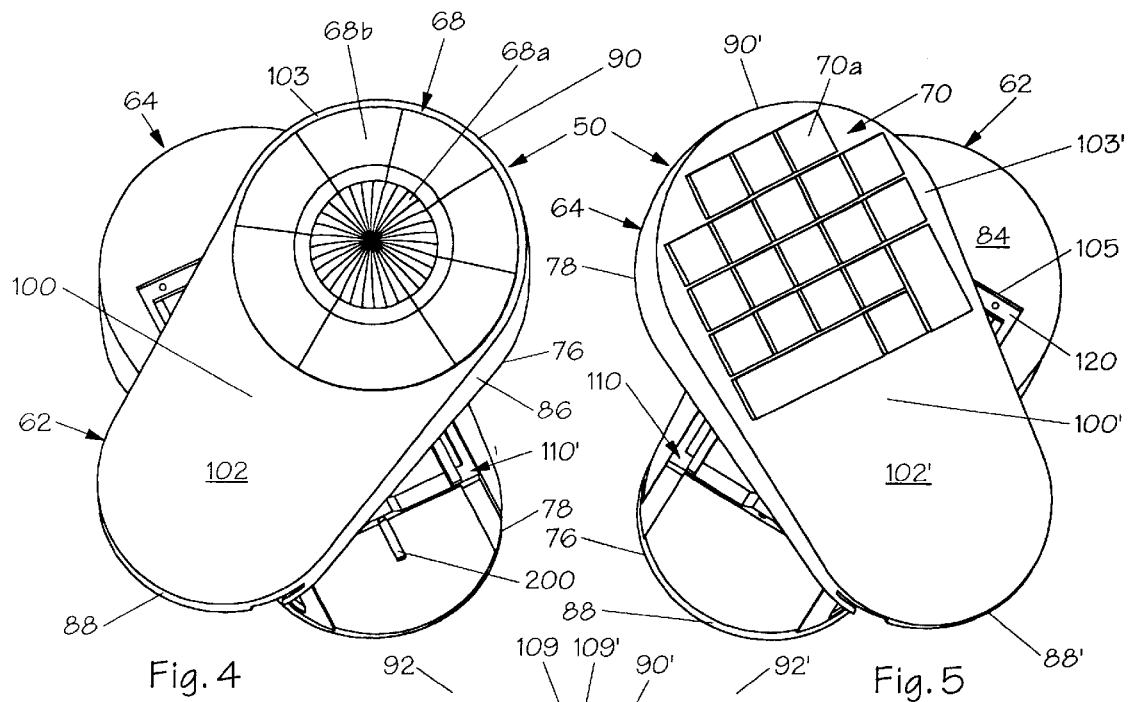
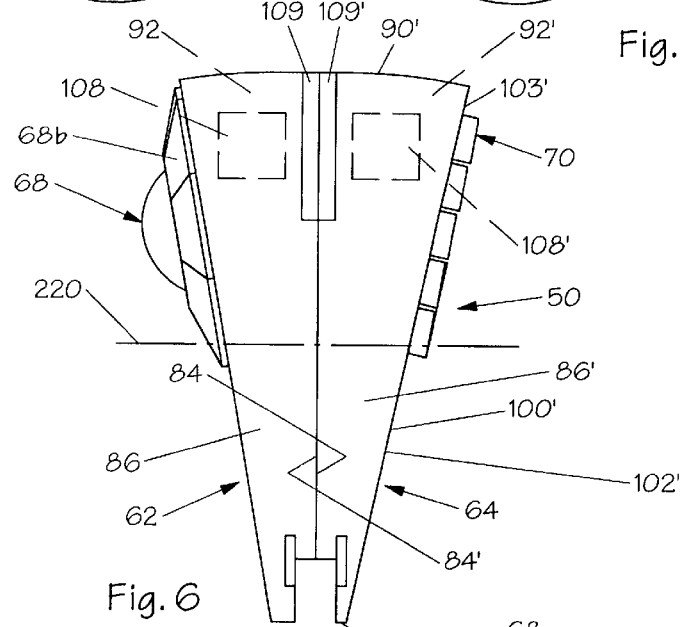
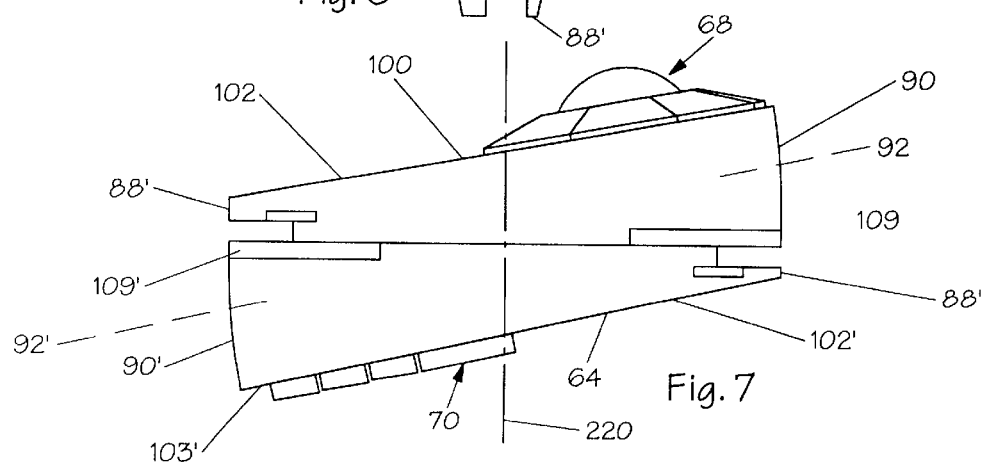

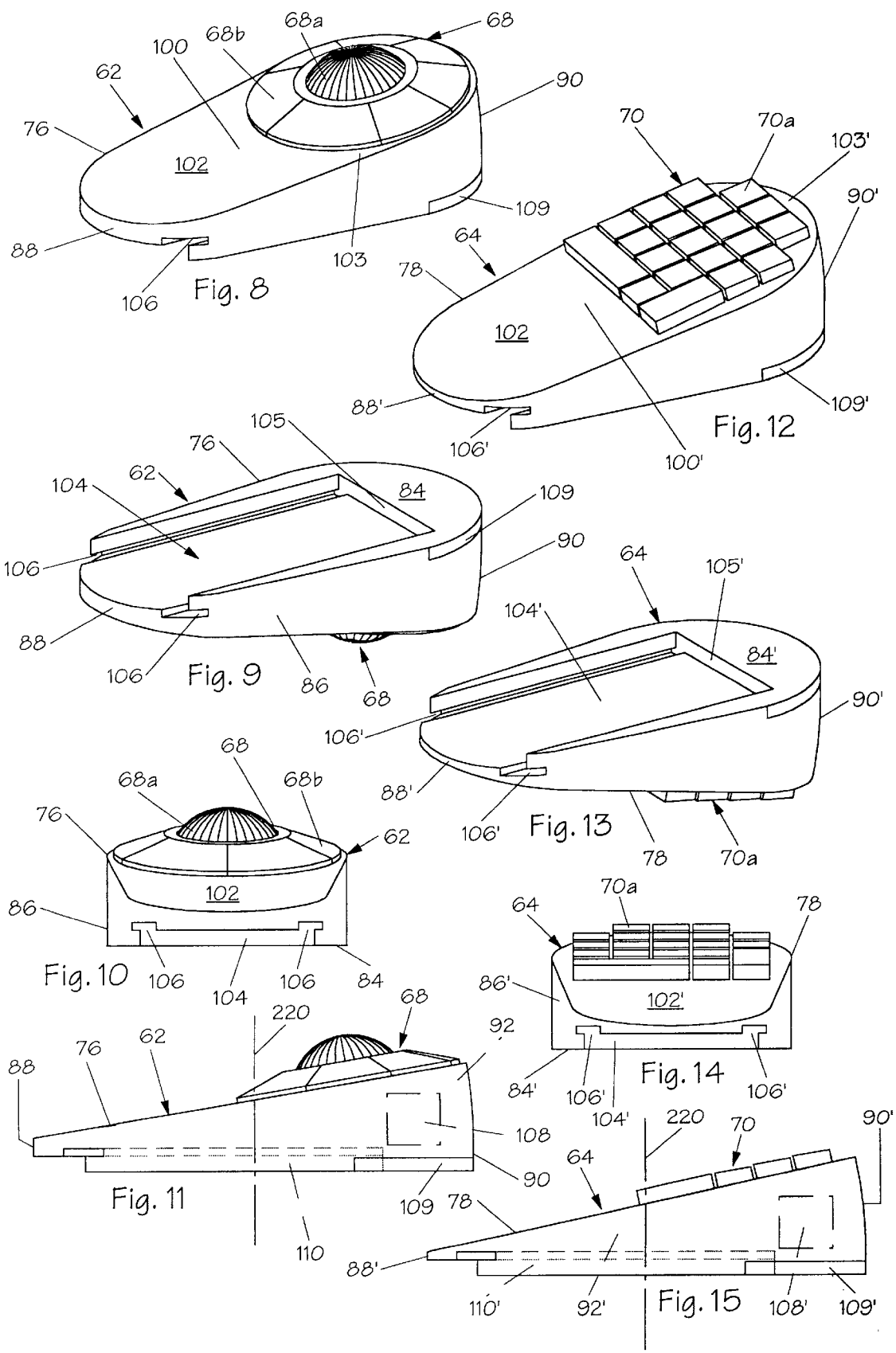

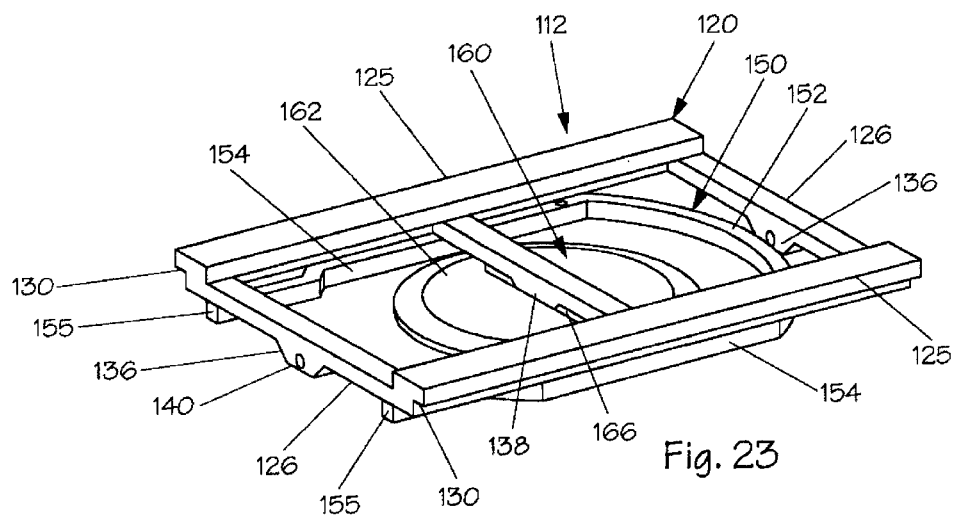
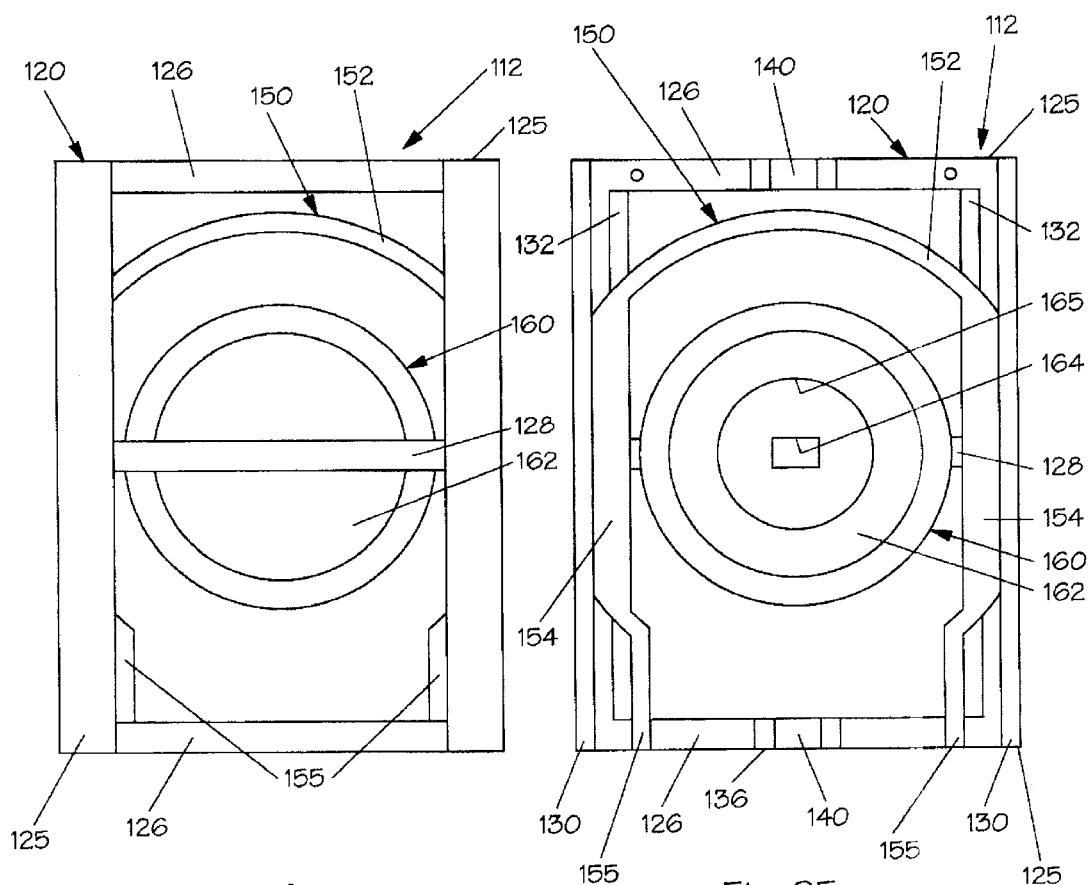
Fig. 23
Fig. 24   Fig. 25

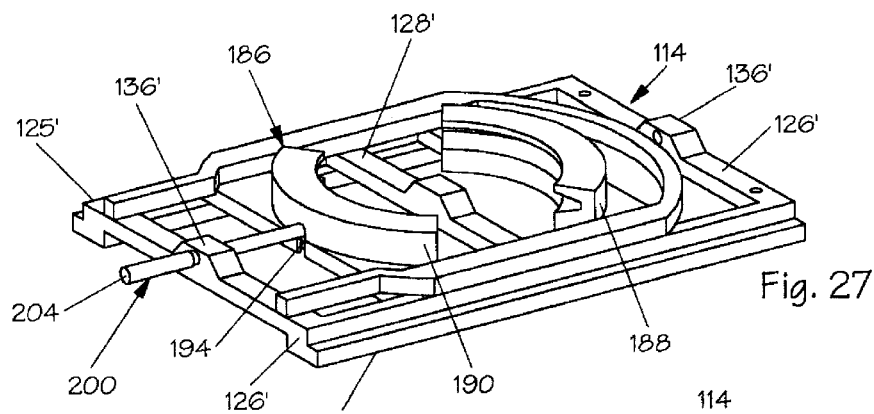
Fig. 27
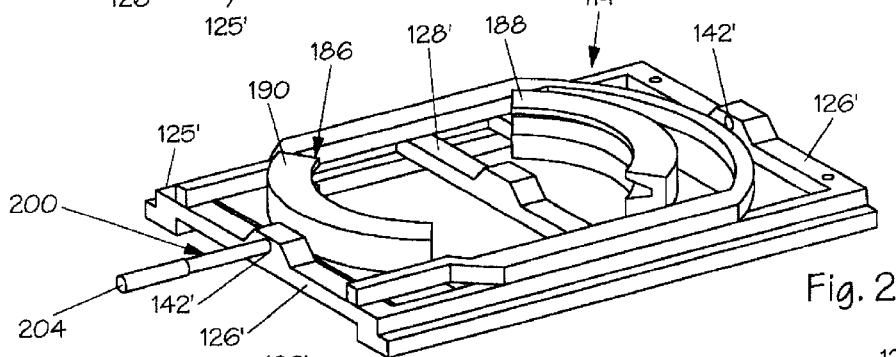
Fig. 28
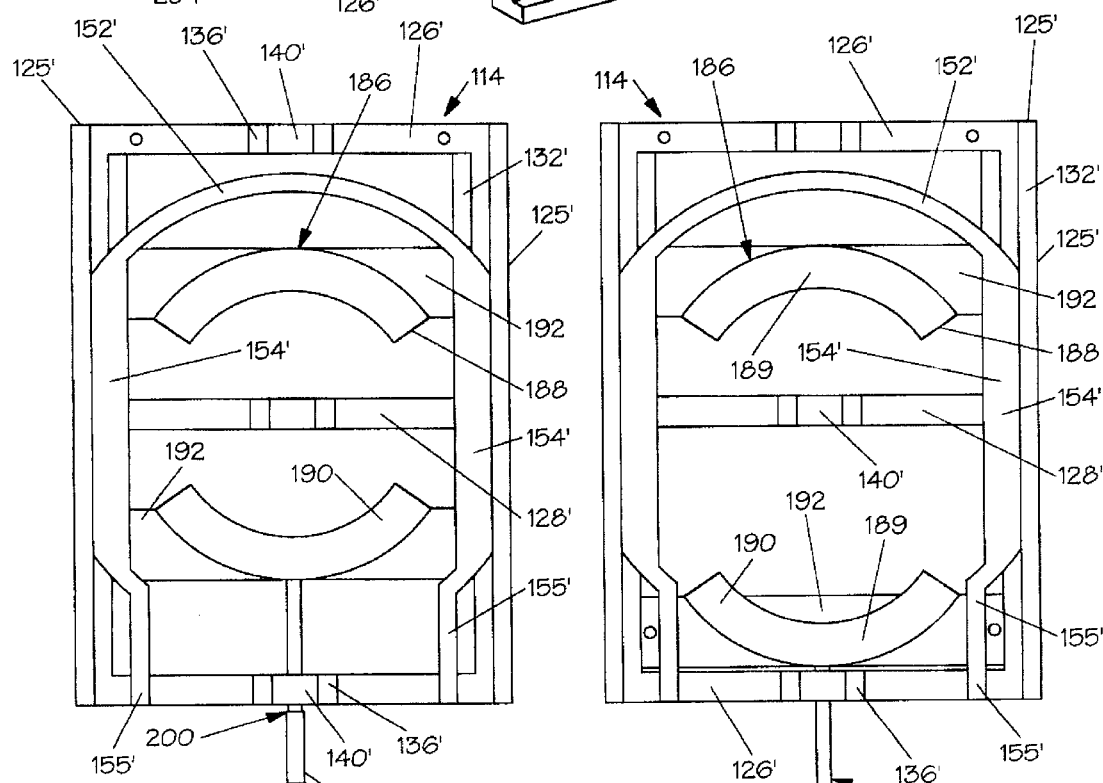
Fig. 29
Fig. 30

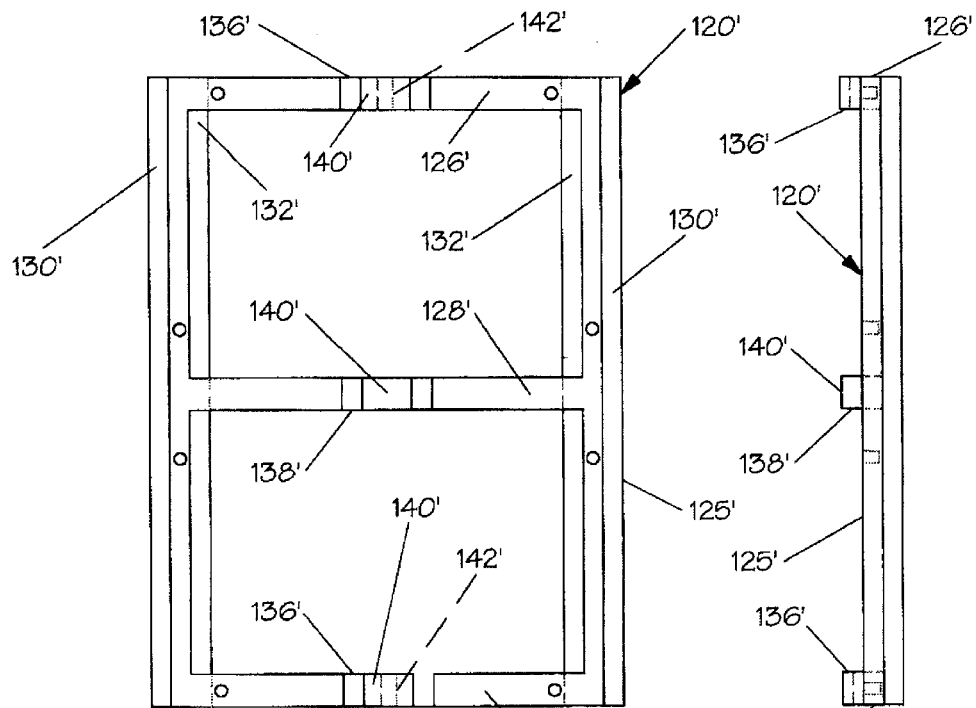
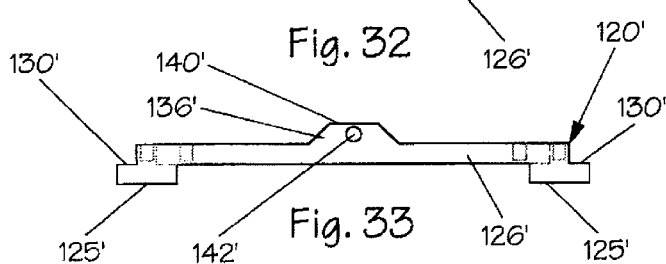
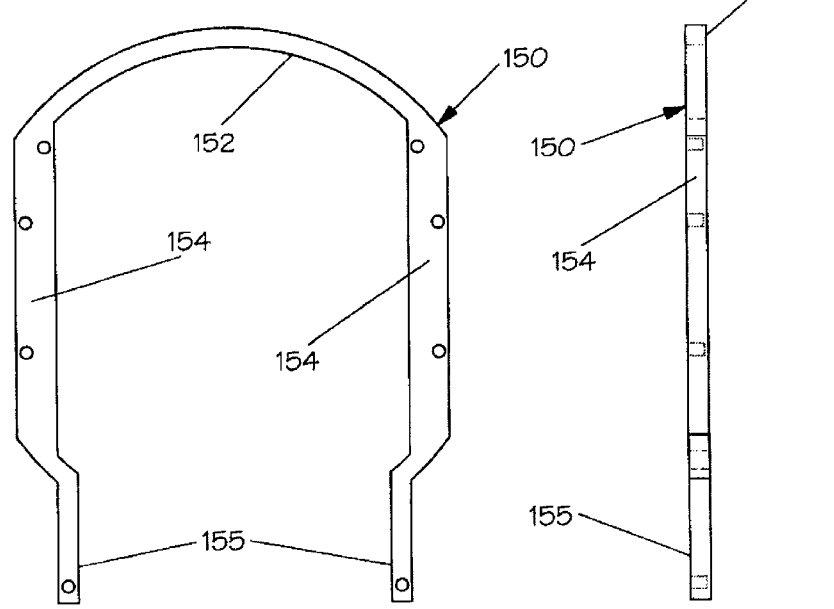

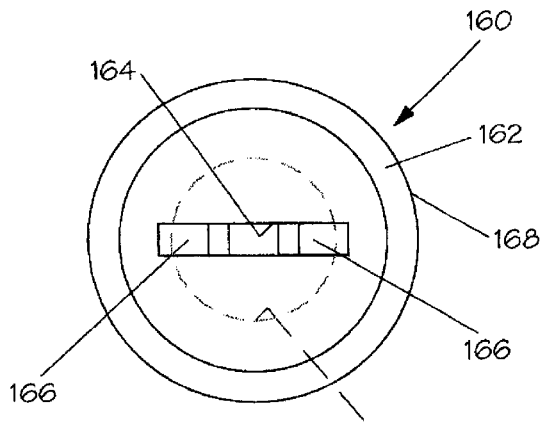
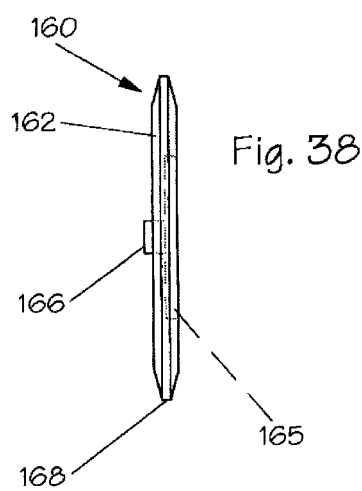
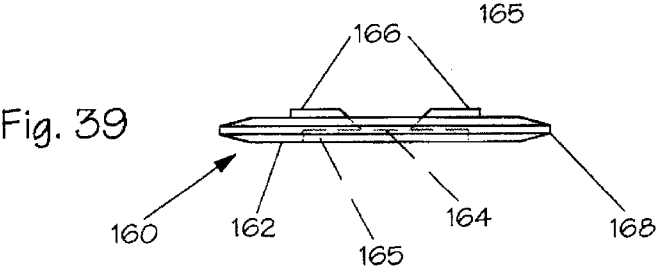
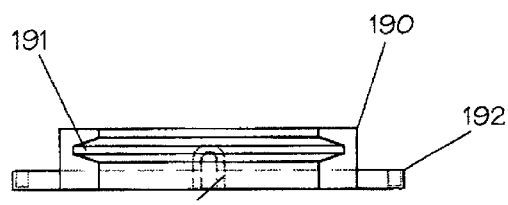
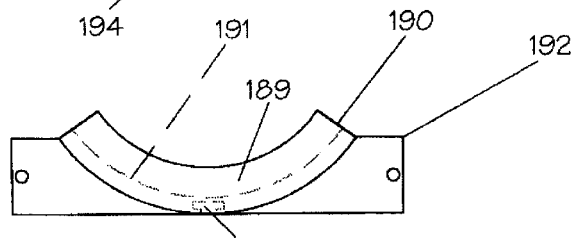
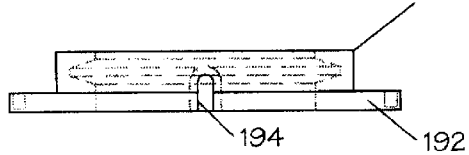
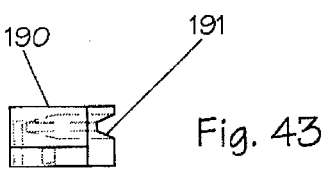
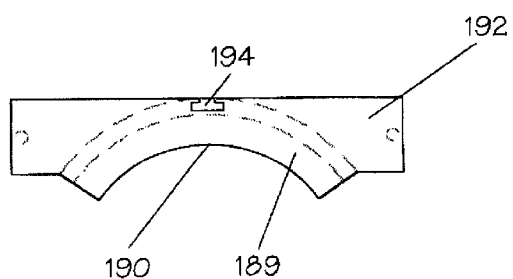

TWO-HANDED INPUT APPARATUS AND METHOD

FIELD OF THE INVENTION

The present invention pertains to a two-handed, input apparatus and method and more particularly to an apparatus for mounting and manipulating input devices that is held in and manipulated by both hands of a user and to a method of using the apparatus.

BACKGROUND

In operating CAD, three-dimensional (3D) modeling and animation systems, a designer conventionally inputs data into the system through multiple input devices such as a keyboard, a finger touch-tablet, a trackball, a joystick, a mouse, or 3D input devices. A typical workstation or other set-up uses several of such single-handed, single purpose, input devices in front of at least one monitor, all located on a desktop. In use of the system, the operator's principle focus is on the monitor but at the same time, in order to enter data, the operator must move his or her hand from one input device to another. Accordingly, the hand must be continually repositioned on various input devices, requiring the operator to look away from the monitor and at the device to be used.

Such shifting of the eyes between the display and various input devices when using CAD, 3D modeling and animation systems, and other computer equipment causes the user to break his concentration on the work-in-progress. Having to remove one's eyes from the screen, to look instead at the next input device to-be-used while the next input is made, and then to look back at the screen and find the point on the display affected by the input, to confirm its entry, is distracting, time-consuming, inefficient, prone to error, and tiring. The foregoing modus operandi is exacerbated by the increasing need to input multi-dimensional spatial data, such as 3D information, requiring in itself multiple input devices, such as disclosed in U.S. Pat. No. 5,298,919 to Chang and U.S. Pat. No. 5,313,230 to Veniolia et al.

In addition, the conventional input devices for CAD, 3D modeling and animation systems, force an operator to sit in a relatively fixed position in front of a desk. It is well established that the use of even just one computer input device, such as a keyboard or pad, on a desktop can cause several different types of muscle strain on the user. As such, the described inputting method with multiple devices adds to the normal fatigue, discomfort, and other ergonomic problems associated with working at a desk top.

Improvements have been proposed to overcome some of the problems with desktop input devices. For example, a single handed, hand-held input device has been proposed in NASA Tech Brief, Vol. 16, No. 11, Item #64, from JPL New Technology Report NPO-110231/7740, entitled Portable Computer Keyboard for Use With One Hand, by G. Friedman dated November 1992. The Friedman device is a hand-held, egg-shaped input device providing seven keys for the entry of normal keyboard data in place of a standard computer keyboard. Although this device does not require a desktop for its use, it is not suited to mount input devices of the various types necessary for CAD, 3D modeling and animation operation. Moreover, it must be grasped by the same hand that inputs the data and at the same time as the keys are being manipulated, a possible source of stress on the hand involved. The single hand, hand-held input devices in U.S. Pat. Nos. 5,063,376 to Chang and 5,296,871 to Paley are subject to the same limitations as the Friedman device.

Apart from operating CAD, 3D modeling and animation systems and other computer equipment, various electrical, optical, or electro-optical equipment are controlled with input devices providing keypads, joysticks, dials, switches, and other control elements. For example, a television set, a VCR, a CD player, an amplifier, or other stereo equipment typically has its own remote control device. Although some integration of controls for different appliances has occurred, particularly as between a TV and a VCR, it is not uncommon to use three or four separate remote controls for the typical TV, VCR, and stereo equipment in many households. Such remote control devices are single purpose input devices that are used in free space and require two hands to operate. That is, the user must pick up the control, hold it in one hand, manipulate the buttons or other control elements with the free hand, and then set the control down before picking up a second input device to be operated.

SUMMARY

An apparatus and method are provided for inputting data including controls to a computer, or other equipment. Included are a two-handed, hand-held apparatus and a method for inputting data while using the apparatus. The apparatus includes a plurality of input or control devices, each having input elements for inputting data to a computer or other equipment by the transmission of signals to such computer or equipment, and a pair of holders that mount the input devices and have holding portions and hand resting portions. The holders are releasably joined in back-to-back relation by a connector mechanism that allows the holders to be individually held in free space by and between the two hands of a user. The apparatus can be used in any position but the preferred method of use involves turning or rotating the hands so that a selected input device is positioned on top in a convenient position for manipulation by the uppermost hand while it rests on the uppermost holder and while the entire apparatus is being supported by the lowermost hand. More specifically, the connector mechanism pivotally interconnects the holders and has features which enable the holders and their input devices to be separated from the apparatus so that they can be interchanged with other holders mounting different input devices.

An object of this invention is to provide a two-handed, hand-held input apparatus.

Another object is to provide a method of operating a two-handed, hand-held input apparatus.

A further object is to enable a computer system, such as a CAD, 3D modeling and animation system or workstation, or other equipment to be operated or controlled with multiple input devices, while allowing the equipment, or the work in progress on a display of the equipment, to be continuously viewed so that the user does not have to look away from the equipment or its display.

Another object is to improve the efficiency of controlling equipment, such as inputting data into a computer, by enabling the user to rapidly switch from one input or other controlling device to another while minimizing the possibility of committing errors in manipulating the controlling devices.

An additional object is to control equipment, by inputting data or other controls, by using both hands of a user wherein one hand and then the other alternately serves as a support while the remaining hand manipulates controlling elements or wherein both hands can simultaneously support and manipulate controlling elements, and in any case, neither hand has to move away from its controlling elements to another set of controlling elements.

A further object is to provide an apparatus that is operated in free space by and between both hands of a user for inputting data including controls into a computer or other equipment or otherwise controlling the same.

An additional object is to enable a computer system or other equipment to be operated or controlled while in a user-selected posture that is more natural, comfortable and less fatiguing, as contrasted with being required to sit in a particular posture at a desk.

Yet another object is to enable equipment such as a computer system or television to be operated by users unable to be seated, such as those who are bedridden or handicapped, or by those who wish to stand while operating the equipment.

A further object is to remove certain input devices from a computer desktop and thereby provide more desk space around the computer.

A still further object is to provide a portable control for a computer system or other equipment so that the system can be operated while sitting, standing, lying down, or moving around in various positions in the near vicinity of the computer monitor but not confined to a sitting position immediately in front of the monitor for the system or equipment.

Yet an additional object is to provide an apparatus for inputting data or controlling equipment with multiple input devices that allows the pre-assembly of dedicated input devices or is modular and allows several different types of input devices to be interchanged.

Still another object is to provide a hand-operated control of the type described that is ergonomically shaped to hand contours and is thus comfortable to hold and use and which in addition can be operated equally well by right-handed or left-handed users.

An additional object is to reduce the likelihood of errors in the operation of CAD, 3D modeling and animation systems, workstations, or other computer systems.

Yet another object is to integrate a plurality of input devices on a common apparatus so that data can be entered from selected input devices while holding the apparatus in and between the hands of the operator.

Still another object is to obviate the need for multiple, separate, single-use remote controls for a TV, VCR, stereo, or other appliances, wherein the user picks up one control, manipulates it to operate one appliance, and sets it down, and then repeats the process with other controls and appliances.

Another object is releasably to interconnect a pair of hand-held holders for data input devices that allows the holders, while being held by and between the user's two hands, to be pivoted relative to each other by simultaneously rotating the hands alternately clockwise and counterclockwise about the longitudinal axes of their respective arms.

Still another object is to enable input devices, that are mounted on a two-handed, hand-held apparatus, to be interchanged with other input devices.

An additional object is to provide a two-handed, hand-held apparatus for mounting and manipulating a plurality of input devices that will accept various input devices, including but not limited to a keyboard (standard, numeric or one-handed), a digitizing or graphics or finger touch-tablet, a trackball, a joystick, multi-dimensional input devices such as 3D input devices for inputting multi-dimensional spatial data, or any combination of miscellaneous controller devices such as those used for remote control of televisions, VCRs, stereos, and/or robotics.

Yet a further object is to provide a control with multiple input devices that is operated by and between the two hands of a user that enables the user to rapidly switch from one input device to another by merely rotating the hands and wrists thereby to place a selected input device in a convenient operating position.

A further object is to provide a mechanism for pivotally interconnecting two parts or devices, or one part on another part, so that the parts or devices are supported relative to each other in a stable manner throughout a three hundred sixty degree range of pivoting motion.

Still another object is to provide such a mechanism for interconnecting multiple units for pivotal movement relative to each other wherein the resistance to pivoting motion is adjustable.

Yet another object is to provide a mounting mechanism for pivotally interconnecting multiple units wherein the interconnected units can be released from the mechanism for interchange with other units, for maintenance, or for other reasons.

An additional object is to provide an interconnecting mechanism of the type described that is made of relatively few parts of which several are symmetrical duplicates thereby to facilitate molding and automated assembly.

These and other objects, features and advantages of the present invention will become apparent upon reference to the following description, accompanying drawings, and appended claims.

DESCRIPTION OF THE DRAWINGS

FIG. 4 is a perspective view of the subject input apparatus, slightly enlarged from FIGS. 1 through 3, showing one of the input devices on its holder on top and rotated approximately sixty degrees from the input device and its holder on the bottom, similar to the position of the apparatus shown in FIG. 1, and thereby exposing part of the connecting mechanism that pivotally interconnects the holders.

FIG. 5 is a view similar to FIG. 4 but with the holders reversed in position similar to the position of the apparatus shown in FIG. 3.

FIG. 6 is a side elevation of a subject apparatus shown with the holders and their input devices in a congruent position similar to that shown in FIG. 2 but slightly enlarged therefrom.

FIG. 7 is also a side elevation of the apparatus of the subject invention with the holders rotated one hundred eighty degrees relative to each other from the position of FIG. 6 and in a more convenient storage position.

FIG. 8 is a trimetric top view of one of the input devices and its holder as incorporated in the apparatus of the present invention.

FIG. 9 is a trimetric bottom view of the holder and device of FIG. 8.

FIG. 10 is an end elevation of the input device and holder as shown in FIG. 8.

FIG. 11 is a side elevation of the holder and input device as shown in FIG. 8.

FIG. 12 is a view similar to FIG. 8 but showing another input device on its holder.

FIG. 13 is a view similar to FIG. 9 but showing the bottom of the holder and input device of FIG. 12.

FIG. 14 is an end elevation of the holder and input device of FIG. 12.

FIG. 15 is a side elevation of the input device and holder of FIG. 12.

FIG. 23 is a trimetric view of the male coupling unit of the connecting mechanism.

FIG. 24 is an enlarged top plan view of the coupling unit shown in FIG. 23.

FIG. 25 is a bottom plan view of the coupling unit shown in FIG. 23.

FIG. 27 is a trimetric view of the female coupling unit of the subject connecting mechanism with the female coupling unit in closed position.

FIG. 28 is a view similar to FIG. 27 with the female coupling unit in uncoupled position.

FIG. 29 is an enlarged plan view of the female coupling unit shown in FIG. 27.

FIG. 30 is a plan view of the female coupling unit as shown in FIG. 28.

FIG. 32 is an enlarged top plan view of the connector frame used in both the male and female coupling units of the subject connecting mechanism as shown in FIG. 19.

FIG. 33 is an end elevation of the frame shown in FIG. 32.

FIG. 34 is a side elevation of the frame shown in FIG. 32.

FIG. 35 is an enlarged plan view of the supporting guide incorporated in the male and female coupling units of the subject connecting mechanism as shown in FIG. 19.

FIG. 36 is a side elevation of the supporting guide shown in FIG. 35.

FIG. 37 is an enlarged top plan view of the male coupling disc of the connecting mechanism as shown in FIG. 19.

FIG. 38 is a side elevation of the disc shown in FIG. 37.

FIG. 39 is also a side elevation of the disc shown in FIG. 37 but taken from an angle ninety degrees removed from the position of FIG. 38.

FIG. 40 is an enlarged inside side elevation of the movable coupling shoe of the female coupling unit of the subject connecting mechanism, as shown in FIG. 19.

FIG. 41 is a top plan view of the movable shoe shown in FIG. 40.

FIG. 42 is an outside side elevation of the movable coupling shoe shown in FIGS. 40 and 41.

FIG. 43 is an end elevation of the movable coupling shoe shown in FIG. 42.

FIG. 44 is a bottom plan view of the movable coupling shoe shown in FIG. 41.

DETAILED DESCRIPTION

Figure 1:
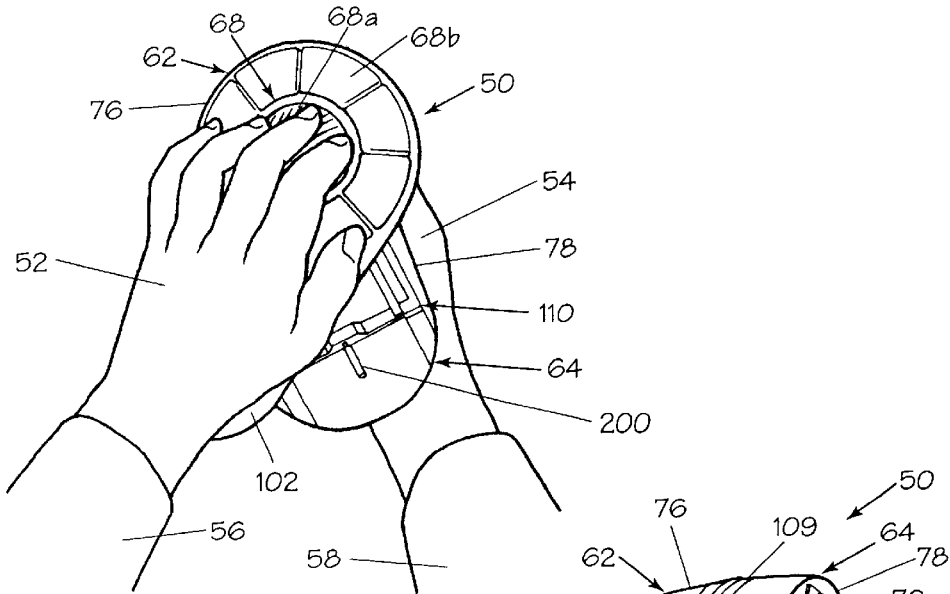
FIGS. 1 through 3 are perspective views of the two-handed, hand-held input apparatus of the present invention shown being held by and between both hands of a user and showing the method of using the apparatus.
Figure 2:
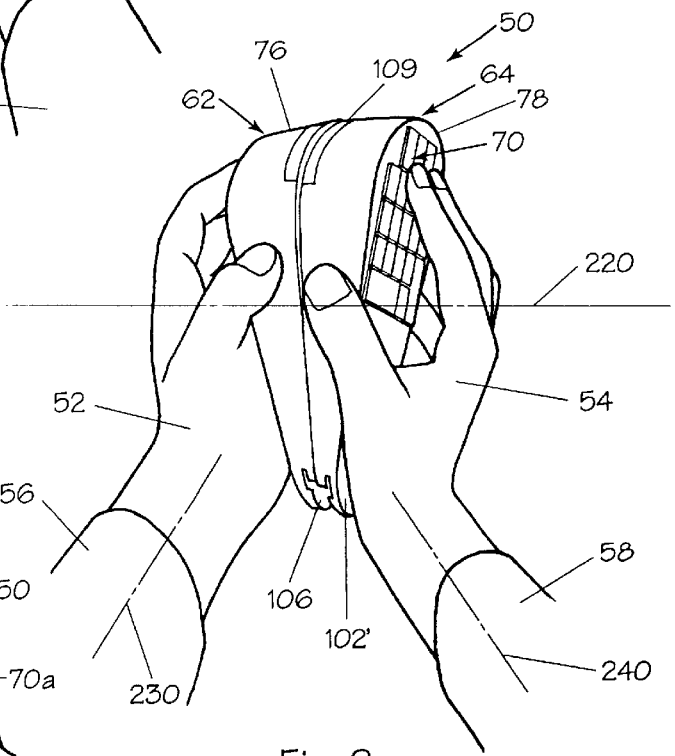
Figure 3:
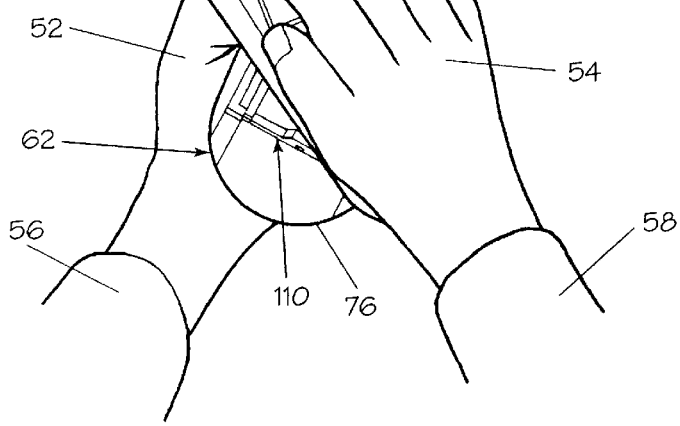

With reference to FIGS. 1 through 7, a two-handed, hand-held input apparatus constructed in accordance with the principles of the present invention is generally identified by the numeral 50. The apparatus is shown in FIGS. 1–3 being held by and between the left and right hands 52 and 54, respectively, of a user with the left and right arms being indicated by the numerals 56 and 58 respectively.

In general, the subject apparatus 50 (FIGS. 1–7) includes first and second holders 62 and 64 on which are individually mounted input devices 68 and 70. These input devices are of the type normally used to input data, including controls or other information, into a computing system or other electrical, electronic, optical, or electro-optical equipment. Such equipment may include a work station having at least one monitor and several input devices such as is employed in the field of computer-aided design, 3D modeling and animation. Furthermore, the equipment controlled by such input devices includes but is not limited to televisions, VCRs, stereos, robotics, and like equipment. None of this equipment is shown in the drawings nor described in detail since it is well known and is not part of the present invention.

The input device 68 (FIGS. 1, 4, and 6–8) is shown as a track ball 68a surrounded by a plurality of macro keys 68b radially related to the track ball, and the input device 70 (FIGS. 2, 3, 5 through 7, and 12) is shown as a numeric key pad of twenty keys 70a. It is to be understood, however, that the subject invention is not limited to these particular input devices, the two-handed, hand-held apparatus 50 will accept various input devices including but not limited to the illustrated track ball and key pad, a digitizing or graphics or finger touch-tablet, a keyboard (standard, numeric, or one-handed), a joystick, or multidimensional input devices such as 3D input devices for inputting multidimensional spatial data, and any combination of remote controls for TVs, VCRs, stereos, and/or robotics. It is also to be understood that the input devices are not limited to the input of data such as words, numbers or commands but may be capable of entering such data as controls or signals, that is, data in a more general sense.

With reference now to FIGS. 4 through 15, the first and second holders 62 and 64 respectively include first and second wedge-shaped housings 76 and 78 of uniform size and shape. It is to be noted that reference is made to "first" and "second" holders and housings for descriptive convenience only, since the holders and the housings are identical. Because of their identity, only the housing 76 (FIGS. 8–11) is described in detail, with corresponding parts of the housing 78 being given the same reference numeral followed by a prime.

Accordingly, the first housing 76 (FIGS. 8–11) includes a planar front wall 100 (which as oriented in FIG. 8 is a top wall); a back wall 84 (which as oriented in FIG. 9 is a bottom wall); a side wall 86; opposite open and closed end walls 88 and 90, and a hollow interior 92 surrounded by the front, back, side and end walls. Although the subject invention is not limited to any particular dimensions, it may be useful in understanding how the subject apparatus is held by and between the hands of the user to refer to the approximate dimensions of the preferred embodiment. Accordingly, the housing 76 has a length of about eight inches, a width of about four inches, a height of about one-half inch at end 88, and a height of about two inches at the end 90. In this regard, it should be noted that FIGS. 4 through 15 are shown at less than one-half scale.

With continued reference to FIGS. 8–11, the front wall 100 of the housing 76 includes a mounting surface or area 103 occupying about one-half of the surface area of the front wall and terminating at the end wall 90, and a hand-resting surface or area 102 occupying the remainder of the area of the front wall and terminating at the end wall 88. The track ball 68a and macro keys 68b are mounted on the mounting surface 103, whereas the hand resting surface is clear. That is, the hand resting surface is of sufficient area to allow the user to place the palm of one of his or her hands 52 thereon (the left hand as shown in FIG. 1, but it could be the right hand 54) so that the fingers can easily manipulate the track ball and macro keys therearound. Moreover, although not shown, this resting surface as well as the side walls 86 or other walls or surfaces of the housing may be contoured to conform to a user's hand and cushioned for maximum comfort.

With reference to FIGS. 12–15, the keypad 70a is mounted on the mounting surface 103' of the housing 78, similarly to the track ball and keys 68a and 68b, so that the palm of the user's hand 54 (or 52) can rest on the hand resting portion 102' and the fingers of such hand can conveniently manipulate the keys 70a of the keypad.

The back wall 84 of the housing 76 (FIGS. 8–11) has a rectangularly-shaped recess 104 which extends longitudinally of the housing, opens through the end wall 88, and terminates at a internal transverse wall 105. Elongated transversely spaced slots 106 are also provided in the back wall at both sides of the recess, and these slots also extend the full length of the recess from the transverse wall and open through the end wall 88.

With reference to FIGS. 11 and 15, a signal generator 108 is contained within each of the housings 76 and 78 in order to generate signals representative of the data being entered in the respective input devices 68 and 70. These signals are transmitted to the equipment being controlled, not shown, from the signal generators through infrared (IR) devices 109 and 109' mounted in the housings, or through cables, not shown, interconnecting the signal generators and the equipment. As shown, each IR device preferably includes a one hundred-eighty degree IR panel in the closed end wall 90, 90' of each housing. No detail is shown nor described regarding the signal generators, IR devices, or cables since these components, their interconnections and operation for converting movement of the input devices into electronic signals and for transmitting the same to the equipment being controlled are well known.

The subject hand-held input apparatus 50 also includes a connecting or pivoting mechanism 110 which interconnects the housings 76 and 78 and thus the holders 62 and 64 (FIGS. 16–22). This connecting mechanism, in general, includes a male coupling unit 112 (FIGS. 22–26) and a female coupling unit 114 (FIGS. 22 and 27–31). Each of these coupling units is now described.

Figure 26:
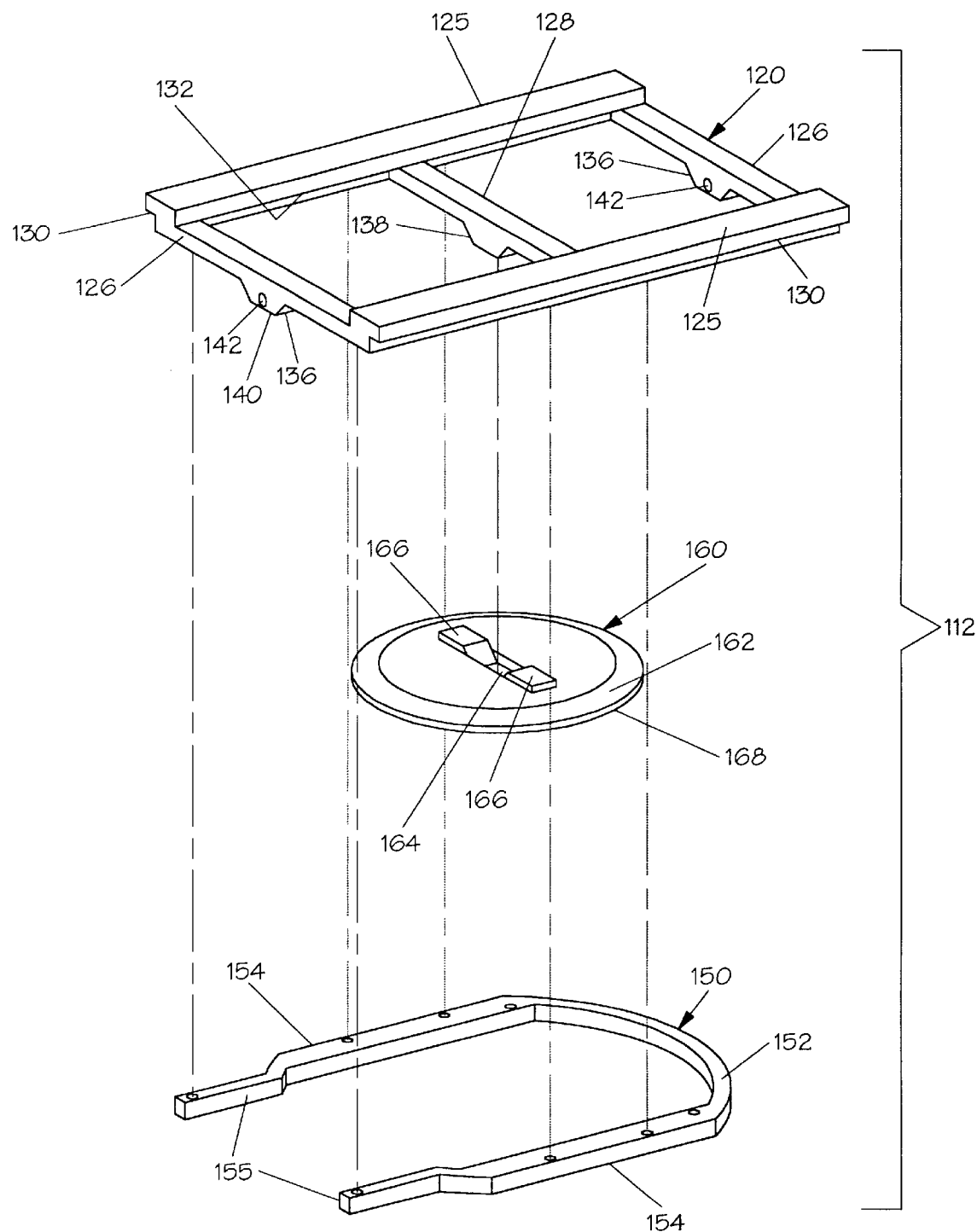
FIG. 26 is an exploded trimetric view of the male coupling unit shown in FIG. 23.

With reference to FIGS. 22 through 31, the male and female coupling units 112 and 114 include duplicate and symmetrical, rectangular male and female connector frames 120 and 120'. FIGS. 32 through 34 show the female connector frame by itself. The male connector frame in FIG. 26 is structurally identical to the female connector frame in FIGS. 31 and 32, but the FIG. 31 frame is inverted from the FIG. 26 frame in their assembled condition. Each frame (FIG. 32) has a pair of spaced parallel longitudinally extending side bars 125, 125' interconnected by a pair of end bars 126, 126' and a center bar 128'. The side bars have outside longitudinally extending L-shaped rails 130, 130' and inside longitudinally extending L-shaped tracks 132, 132'. Furthermore, frusto-pyramidal end lugs 136, 136' project centrally from the end bars, and a frusto-pyramidal central locking lug 138, 138' projects from the center bar in alignment with and between the end lugs. It is to be noted that the lugs have plateaus 140, 140' which are in a common plane parallel to the plane of their frame. Both of the end lugs have threaded holes 142, 142' therein coaxial with the central longitudinal axis of the frame for a purpose to be described.

Figure 31:
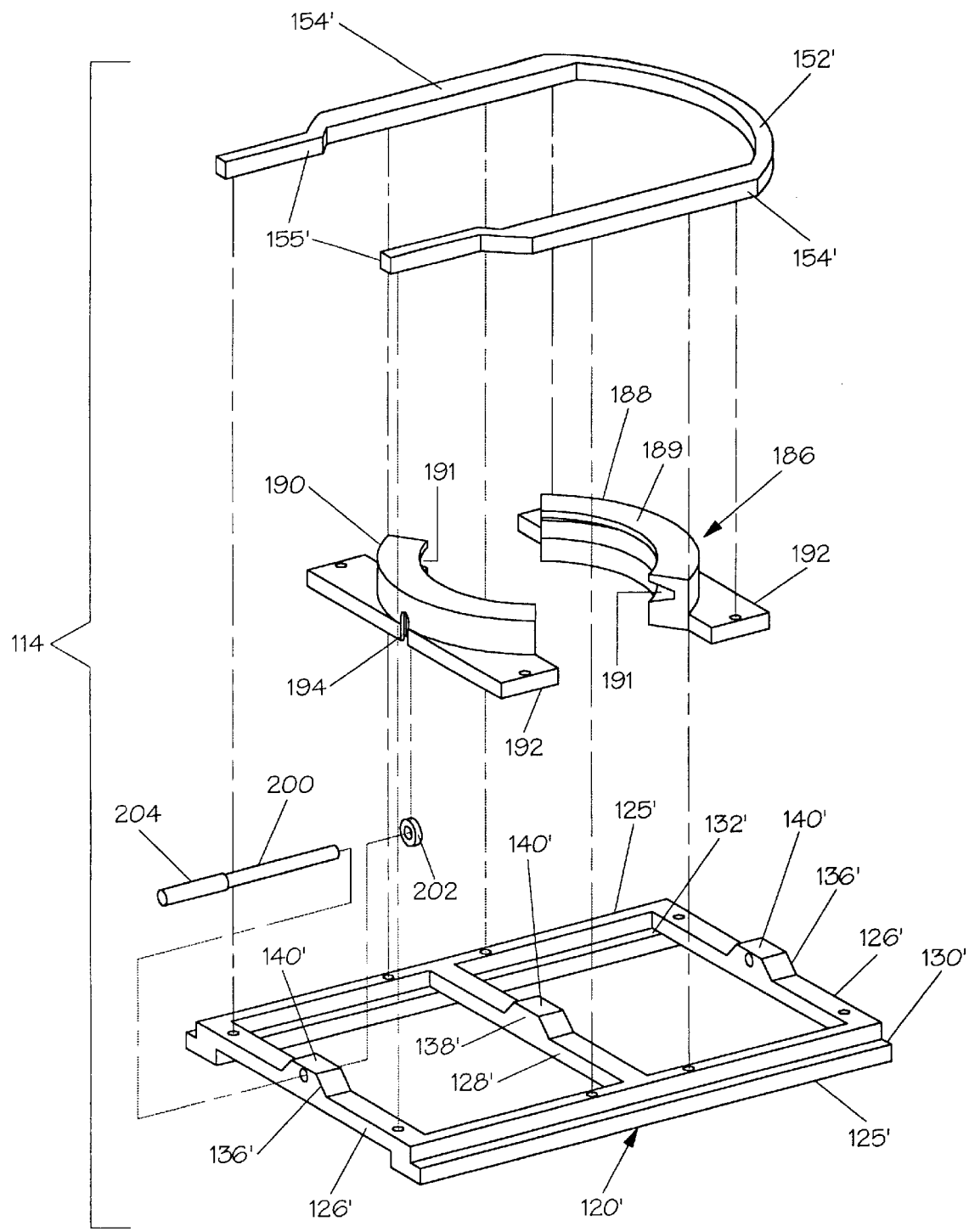
FIG. 31 is an exploded trimetric view of the female coupling unit shown in FIG. 27.

The male and female coupling units 112 and 114 each also includes a wicket- or U-shaped supporting frame or guide 150, 150' (FIGS. 21 through 31, 35 and 36). Each guide (FIG. 35) includes an arch 152, 152' which is a segment of a circle and has opposite ends spaced apart by a distance equal to the distance between the inside edges of the rails 130, 130' of the connector frames 120, 120', that is, slightly less than the width of the connector frames. Each guide also has a pair of transversely spaced side members 154, 154' which extend longitudinally from the ends of the arch, and legs 155, 155' that extend longitudinally from the side members in offset parallel relation thereto. Matching holes are provided in each associated connector frame and the guide so that when the latter are overlaid, the holes align, as indicated by the broken vertical assembly lines in FIG. 26. Thus, each associated frame and guide is assembled by suitable fasteners, not shown, extending into the holes or without fasteners using a plastic welding process. The male supporting guide is fastened under the male connector frame (FIG. 26), and the female supporting guide is fastened on top of the female connector frame (FIG. 31).

As shown in the subassemblies of FIGS. 22 through 26, and 27 through 30, the arches 152, 152' of the male and female supporting guides 150, 150' transversely span their respective male and female connector frames 120, 120' respectively between the side bars 125, 125' and are longitudinally spaced between one of their respective end bars 126, 126' and center bars 128, 128'. Also, the side members 154, 154' extend parallel to and engage the side bars 125, 125' inwardly of their respective rails 130, 130'. The legs 155, 155' terminate at their adjacent end bar 126, 126' but are spaced transversely of the frames a predetermined distance narrower than the spacing of the side bars (FIGS. 25 and 30).

The male coupling unit 112 further provides a male coupling member 160 (FIGS. 22–26 and 37–39) which includes a circular disc 162 having a central rectangular aperture 164 concentrically circumscribed by a circular countersunk annulus 165. The male coupling member also has a pair of diametrically aligned shoulders 166 that project from the disc. The disc also has a circumferential edge 168 that provides an outside diameter less than the diameter of the circle along which the arch 152 lies and less than the distance between the side members 154 of the male supporting guide 150. The disc 162 is assembled with the male connector frame 120 by inserting the central locking lug 138 into the aperture 164 of the disc, as indicated by the broken assembly line in FIG. 26, whereupon the shoulders 166 engage the center bar 128 and the locking lug on opposite sides thereof (FIG. 23). The disc is fastened to the male connector frame either by fasteners that extend through the center bar into the shoulders or by a plastic welding process.

The male coupling member 160 is thus integrally connected to the male connector frame within the outline of the male supporting guide 150 but under the frame, as best seen in FIGS. 23 through 25.

The female coupling unit 114 (FIGS. 22 and 27–31) is different, however, from the male coupling unit 112 in providing a female coupling member 186 that includes a stationary coupling shoe 188 and a moveable coupling shoe 190, each of which includes a jaw 189 with an arcuate V-shaped groove 191 therein (FIGS. 27, 28, 31, and 40 through 44). As best seen in FIGS. 29, 30, 41 and 44, each of these shoes is less than one-half of a circular segment but greater than one-quarter of a circular segment. Each shoe also includes a mounting plate 192 that extends generally endwardly of its respective jaw.

The coupling shoes 188 and 190 are assembled with the female connector frame 120' (FIG. 31) by positioning the mounting plates 192 on the tracks 132' of the female frame 120' under the female supporting guide 150' respectively between the end and center bars 126' and 128'. More specifically, the mounting plate of the stationary shoe 188 is sandwiched between the tracks of the female frame and the side members 154' of the female guide so that the stationary shoe is concentric with and radially spaced inwardly of the arch 152' and longitudinally spaced from the center bar 128'. The stationary shoe is fixed in this position either by fasteners that extend through matching holes in the mounting plate and holes in the guide (see FIG. 31) or by a plastic welding process.

The mounting plate 192 of the moveable shoe 190 (FIGS. 27–31) is also sandwiched between the tracks 132' of the female frame 120' and the side members 154', and legs 155' of the female guide 150' but on the other side of the center bar 128' from the stationary shoe 188. The mounting plate of the moveable shoe, however, is slidably supported by the tracks 132' between the tracks and the side members and legs of the guide. The moveable shoe is thus mounted between the female connector frame and the female supporting guide for slidable movement lengthwise of the frame. The moveable shoe is slidable between a coupled position, as shown in FIGS. 27 and 29, wherein it is concentric with the stationary shoe, and an uncoupled position, as shown in FIGS. 28 and 30, wherein the movable shoe is spaced lengthwise of the frame away from and out of such concentric relation with the stationary shoe. In the coupled position, both shoes are concentric with the center of the female frame at the central lug 138' and have an inside diameter at the groove 191 approximately equal to the outside diameter of the male coupling disc 162. In the uncoupled position, the opening defined by the shoes is greater than the diameter of the disc.

An adjusting rod 200 (FIGS. 22 and 27 through 31) is threadably received in the threaded hole 142' of the end lug 136' of the end bar 126' and has an inner end adjacent to the moveable shoe 190. A retainer ring 202 is secured to the inner end of the rod and is rotatably received in a notch 194 of the jaw 189 of moveable shoe 190 and its mounting plate 192 (FIG. 31). The rod has a handle 204 located outside of the female coupling frame 120' so that by rotating the rod the moveable shoe is moved between its coupled position, as shown in FIGS. 27 and 29, and its uncoupled position (FIGS. 28 and 30), as described above.

In the assembled condition of the coupling units 112 and 114 (FIGS. 16–20), the male coupling disc 162 is rotatably received in the grooves 191 of the coupling shoes 188 and 190. In order to make the assembly (FIGS. 21 and 22), the adjusting rod 200 is backed out to separate the coupling shoes and allow the disc to be positioned in the plane of the grooves of the shoes with the supporting guides 150 and 150' in face-to-face engagement and with the connector frame 120, 120' in opposed spaced relation with their end and central lugs 136, 136' and 138, 138' in contrast.

Figure 22:
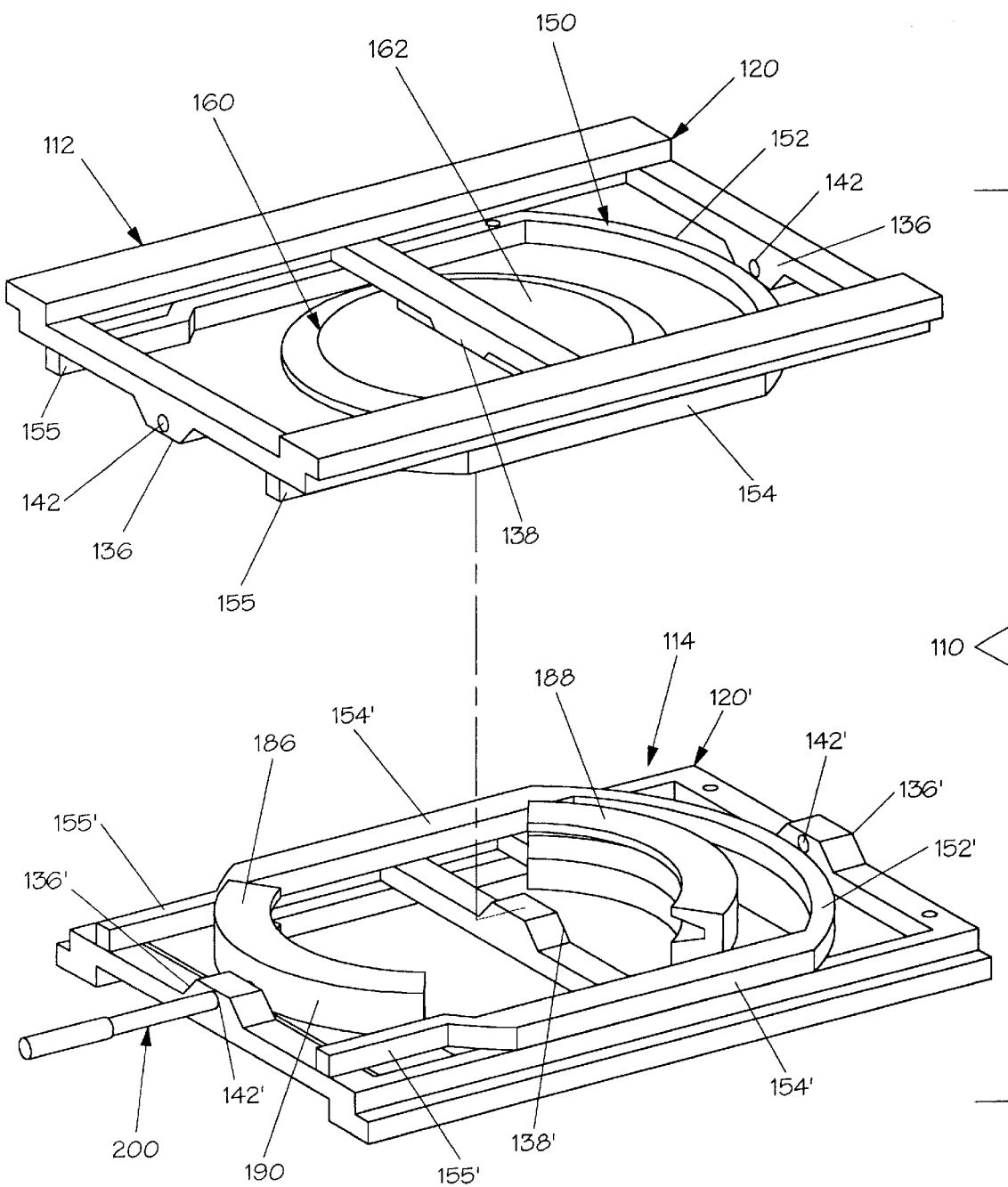
FIG. 22 is an enlarged exploded trimetric view of the coupling units of the connecting mechanism shown in FIGS. 19 through 21.

More specifically, as best visualized in FIG. 22, the male and female coupling units 112 and 114 are initially moved toward each other in face-to-face congruent relation. When the supporting guides 150, 150' are very close to each other but not yet in contact as in FIG. 22, the coupling units are longitudinally adjusted relative to each other so that the central lug 138 is offset from the central lug 138', as indicated by the broken vertical assembly lines in FIG. 22. The units are then moved closer, the arch 152 of the male supporting guide 150 clearing the outside of the stationary shoe 188, until the disc 162 engages the plateau 140' on the central lug 138', it being noted that the annulus 165 in the disc is provided to facilitate centering of the disc on the central lug. At this time, the edge 168 of the disc is in the plane of the grooves 191 of the shoes 188 and 190 and partially circumscribed thereby, and the side members 154 and 154' of the male and female supporting guides are aligned and in engagement. The male coupling unit is then moved longitudinally relative to the female coupling unit toward the stationary shoe 188, as illustrated by the horizontal assembly line in FIG. 22, to fit the edge 168 of the coupling disc 162 into the groove 191 of the stationary shoe. This movement of the male coupling unit also slides the male guide 150 over the female guide 150' so that in the coupled position of the disc and shoes, the guides and the connector frames 120 and 120' are in congruent face-to-face relation with the guides in full slidable engagement; at this time, the plateaus 140, 140' on the end and central lugs 136, 136' and 138, 138' of the connector frames are also respectively in full slidable engagement assuming that the connector frames are congruent.

The adjusting rod 200 (FIG. 27 to FIG. 31) is then threaded inwardly to slide the moveable shoe 190 into its coupled position so that the disc 162 is captured in the grooves 191 of both shoes 188 and 190 for rotatable movement relative to the shoes. Assembled in this manner, the male and female coupling units 112 and 114 can be pivoted relative to each other about the axis 220 (FIGS. 6, 7, and 19) of the disc and the coupling shoes. The pivotal interconnection of the two units is such that the units are free to rotate a full three hundred-sixty degrees relative to each other, and the units are fully supported throughout the complete three hundred sixty degrees of movement by the continuous slidable engagement of the supporting guides and intermittently supported by the slidable engagement of the lug plateaus 140, 140'. The resistance to pivotal movement of the coupling unit, or drag, is adjusted by the rod; threading the rod in increases the drag and threading the rod out reduces the drag. A finely threaded rod allows fine adjustment of this drag.

As an alternate to the threaded adjusting rod 200, a spring-loaded rod, not shown, could be used with the drag built-in and predetermined by the load of the spring. Another alternate embodiment not shown, for moving the moveable shoe 190 of the female coupling unit 114 is to provide an electronic actuator device to control movement of the shoe 190.

Following their assembly as described, the coupling units 112 and 114 remain in their coupled condition during their normal use wherein they are prevented from separating and are allowed only the described rotational movement relative to each other. It is of course possible to disassemble the coupling units if desired for maintenance or for some other reason by merely reversing the steps set forth above.

Figure 16:
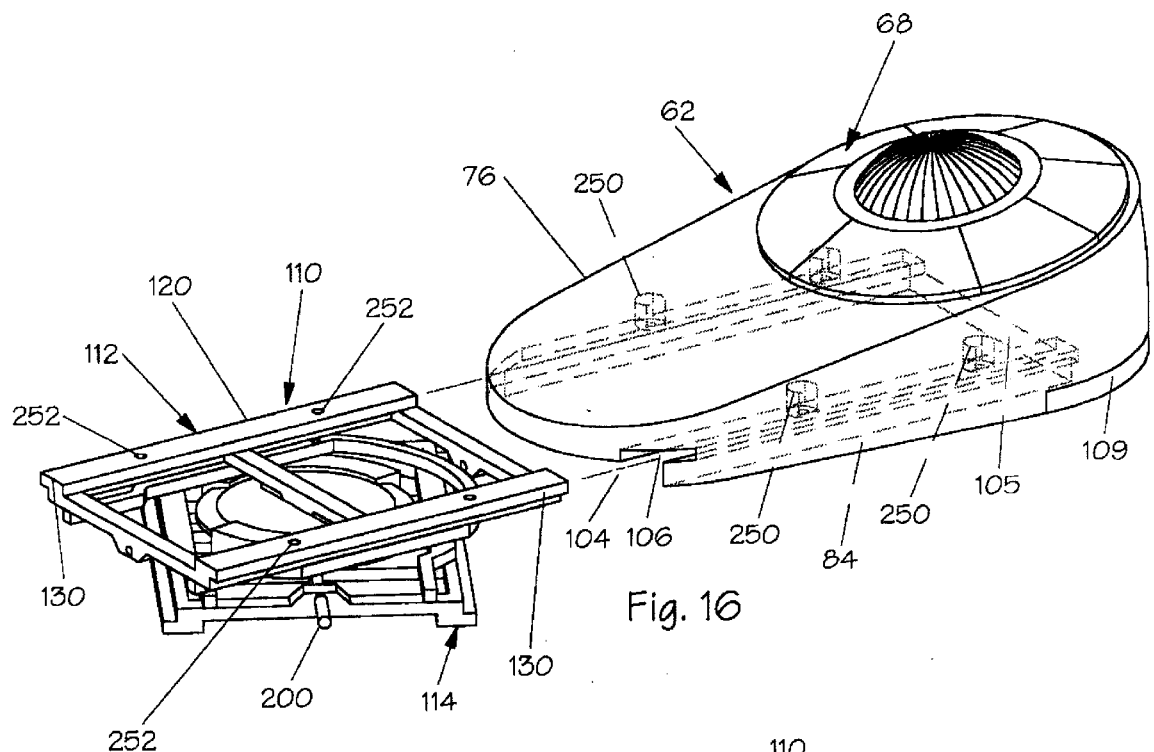
FIG. 16 is an exploded trimetric top view of one of the input devices and its holder and the connecting mechanism of the present invention, showing the connecting mechanism in a position to be assembled with one of the holders.
Figures 17, 18:
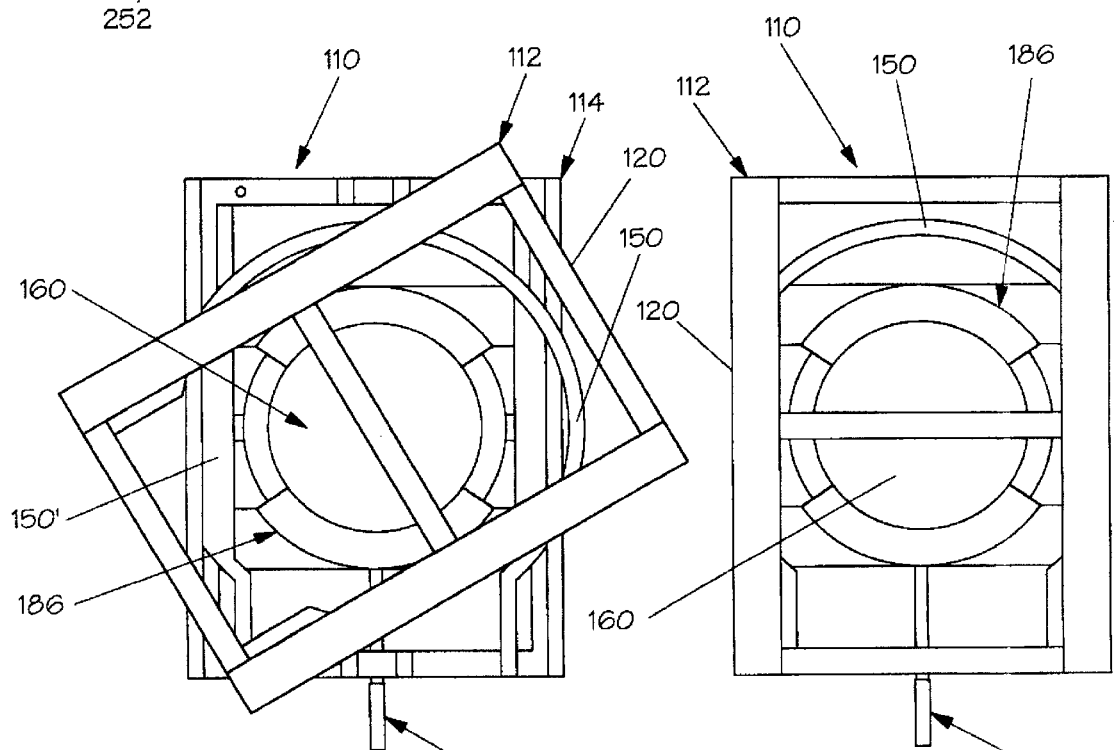
FIG. 17 is a top plan view of the connector mechanism shown in FIG. 16 with the coupling units of the connecting mechanism rotated about sixty degrees relative to each other.
FIG. 18 is a top plan view of the connecting mechanism with the connection units in congruent relationship to each other.
Figure 19:
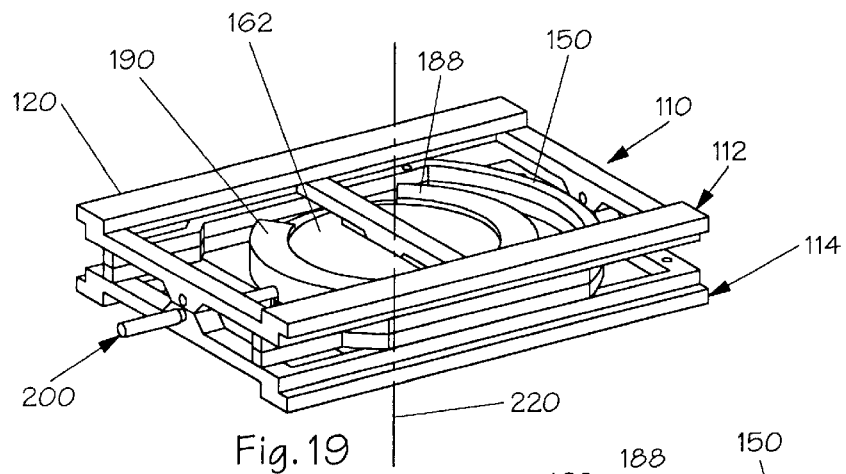
FIG. 19 is a trimetric view of the connector mechanism of the present invention showing the female coupling unit in closed or coupled position.
Figure 20:
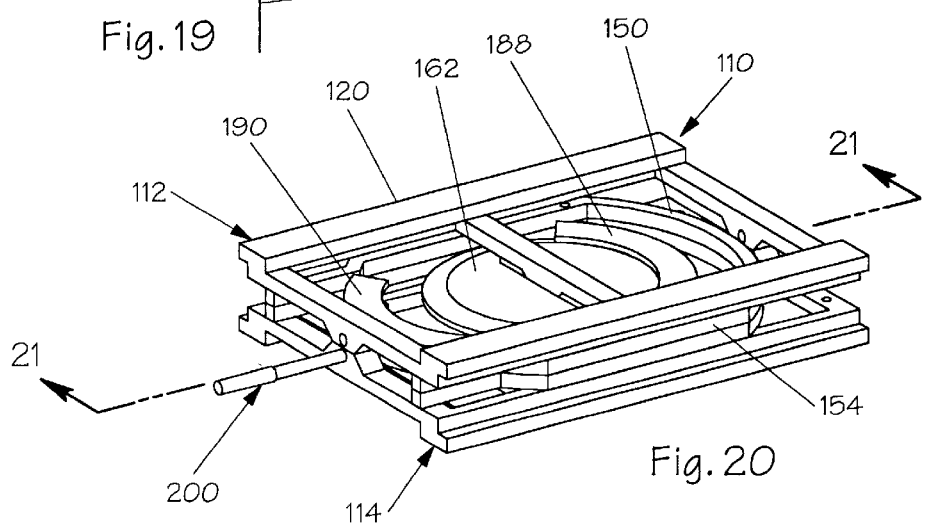
FIG. 20 is a view similar to FIG. 19 with the female coupling unit in open or uncoupled position.
Figure 21:
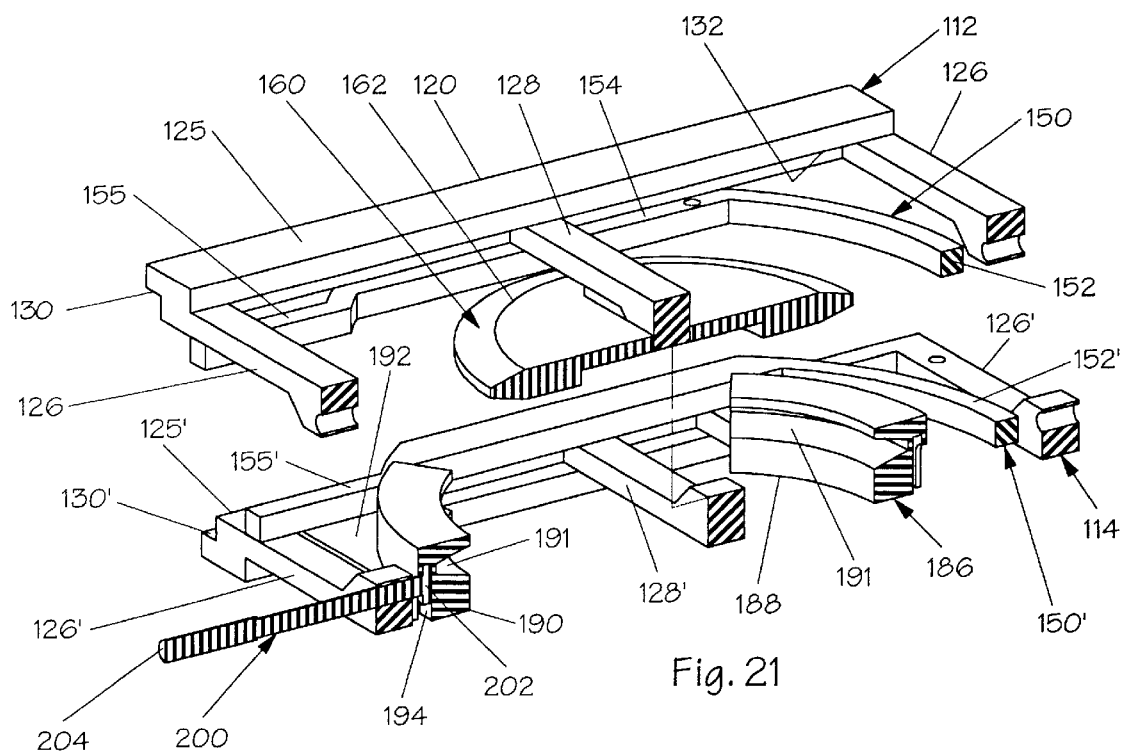
FIG. 21 is an enlarged exploded vertical section taken on line 21—21 in FIG. 20.

With reference to FIG. 16, the first and second housings 76 and 78 are joined by the connecting mechanism 110 as follows: the rails 130 of the male coupling unit 112, for example, are aligned with the slots 106 in the back wall 84 of the first housing 76, and the rails are then slidably inserted into these slots and moved fully within the housing until the inner end of the male connector frame 120 engages the transverse wall 105 (FIG. 5). At this time, the male coupling unit is fully within the recess 104 of the first housing and is thus disposed in back of or underneath the first housing. Then, as will be understood, the other housing 78 is connected to the female coupling unit 114 in a similar manner by sliding the rails 130' into the slots of the housing 78. The two holders 62 and 64 are thus interconnected, as shown in FIGS. 4–7, in back-to-back relation and for three hundred-sixty degree pivotal or rotational movement relative to each other. It will be understood that the length of the connecting mechanism 110 is less than the length of the housing so that the connecting mechanism is completely concealed in back of or underneath each housing when the housings are in their congruent position, as in FIG. 2, and partially concealed in other positions, as in FIGS. 1, 3, 4 and 5. It is also to be noted that rotation of the holders relative to each other is about the axis 220 (FIGS. 6, 7, 11, 15, and 19) of the disc 162 which is perpendicular to the back walls 84 of the housings and extends transversely of each housing.

FIG. 16 indicates spring-loaded ball plungers at 250 in each housing 76 and 78 whose balls slightly protrude into the slots 106, 106'. Detents 252 are located in the side bars 125, 125' of each connector frame 120, 120' so that the balls and detents are in alignment when each of the coupling units 112, 114 is slid into its housing. The balls yield to allow full seating of the connector frame at which time the balls are spring-pressed into the detents. These detent mechanisms, well-known in the art, are thus employed releasably to retain the housings on their respective coupling units 112 and 114.

It is significant that the seven molded parts of the connecting mechanism 110 (FIGS. 26 and 31) include three pairs of symmetrical duplicates, namely, the frames 120, 120'; the guides 150, 150'; and the shoes 188, 190. Fewer parts, of course make it more cost-effective to mold the parts and make the connecting mechanism more adaptable to automated assembly.

OPERATION OF THE APPARATUS AND DESCRIPTION OF THE METHOD

The operation of the subject two-handed, hand-held input apparatus 50 is described with reference to its use for inputting data into a computer-aided design (CAD, 3D modeling and animation) system, not shown but well understood. In such a system, there are typically at least one monitor or display and several input devices normally all located on a desktop. The subject apparatus allows the necessary input devices, as 68 and 70, to be placed on the holders 62 and 64 and thus removed from the desk top. Although only two input devices are referred to as being mounted on the connecting mechanism 110 at any one time, in fact the trackball 68a and macro keys 68b represent two input devices while the keyboard is a third device, so that it is to be understood that the invention is not limited to mounting only two input devices at a time. Moreover, either one or both of the devices 68 or 70 can be removed from the connecting mechanism and replaced by another input device or devices.

In use, therefore, the operator of the CAD, 3D modeling and animation system, for example, can move back away from the desktop in either a sitting or standing position, or as explained above in a reclining position. The input apparatus 50 is held in and between the hands, 52 and 54, of the user (FIGS. 1–3) with the hands in a palm-to-palm facing relation simulating a clapping position. Depending on the orientation of the apparatus, either or both of the holders 62, 64 are grasped by the user's respective hands, as in FIG. 2, or only one holder need be grasped by one hand with the other hand merely resting on its holder, as in FIGS. 1 and 3. When grasped or supported, the holder 62 or 64 is most comfortably held in either hand between the thumb and the little finger with the middle fingers over the respective input device. Although either hand can engage either holder, FIG. 1 shows the palm of the left hand against the hand-resting surface 102 of the holder 62 with the left fingers in a convenient position for manipulating the track ball 68a and the keys 68b. FIG. 3 shows the palm of the right hand 54 against the resting surface 102' of the holder 64 so that the right fingers are disposed over the keys of the keypad 70a in a convenient position for manipulating the keys.

In use, therefore, it is assumed that the apparatus 50 is held or grasped as described in the preceding paragraph and as shown in FIG. 2. When it is desired to input data from the trackball 68a and macro keys 68b, the hands 52 and 54 are preferably rotated in a clockwise direction (as seen by the user looking out at his or her hands) about the axes 230 and 240 of the user's arms 56 and 58 so that the housing 76 is on top and the housing 78 is on the bottom, as illustrated in FIG. 1. In this position, the entire apparatus is supported by the lowermost or right hand 54 with the right hand grasping the lower holder 64, thereby leaving the left hand 52 free simply to rest on the hand resting surface 102 and the left fingers free to manipulate the trackball and keys. Thus it is seen that, as contrasted with single-handed, hand-held input devices, the subject apparatus can be supported in one hand so as to relieve the other hand of any supporting responsibilities and leave it free to manipulate the adjacent input device.

If after inputting data via the input device 68, it is desired to input data from the other input device 70, the hands 52 and 54 are rotated in a counterclockwise direction from the position in FIG. 1 through the position of FIG. 2 into the position of FIG. 3 thereby to reverse the positions of the input devices 68 and 70. That is, now the input device 68 is on the bottom and the input device 70 is on the top; the left hand is grasping holder 62 and is supporting the apparatus 50, and the right hand is free to rest on the supporting surface 102 of the holder 64, and the right fingers are free to manipulate the keypad 70a. As will be evident, the holders and their devices can be rapidly and alternately rotated back and forth as necessary to input data or otherwise manipulate the controls in the manner described.

During this change of position, the hands 52 and 54 rotate around the longitudinal axes 230 and 240 of their respective arms 56 and 58 through an angle of approximately one hundred and eighty degrees, and the holders 62 and 64 and their input devices 68 and 70 rotate on the connecting mechanism 110 through an angle of about one hundred twenty degrees. In either of the described operating positions of FIGS. 1 and 3, however, the holders are at an angle of about sixty degrees to each other.

Although the above described operation involves pivoting the holders 62 and 64 (FIGS. 1–3) relative to each other in order to position the selected input device 68 or 70 on top in a convenient manipulating position, it is not necessary that the apparatus be used in this manner. Ambidextrous individuals may find it preferable to operate the input devices with either hand 52, 56, or simultaneously with both hands. Thus the apparatus may be held and operated in various orientations and irrespective of the relative top or bottom position of the selected input device. If not held as in FIGS. 1 and 3, the most likely alternative is the congruent frontal position of FIG. 2 where the devices are held similar to an accordion or cymbals. Moreover, this apparatus allows such ambidextrous people to operate the input devices simultaneously in the position of FIG. 2, if this is deemed necessary.

Single and dual adjustable ("Velcro" type hook and loop) hand straps, not shown, may be incorporated to facilitate holding or carrying the apparatus 50. In one embodiment, a single hand strap would make it safer to hold the apparatus while standing or moving around. A releasable snap-type fastener could be used to releasably secure the strap to either housing 76 or 78. In another embodiment, dual hand straps individually attached by snap fasteners to the housings 76 and 78 would make it easier to manipulate both input devices 68 and 70 simultaneously as is described above in the preceding paragraph.

One of the most significant advantages of the subject apparatus 50 is that it allows the user to look continuously at the display on the computer monitor, not shown, and to input data without having to move his or her hand from one input device to another input device. Since the hands remain on the holders 62, 64 and in manipulating positions relative to the input devices 68, 70, the operator can continue to look at the display while inputs are being made so that there is no loss of concentration, there is less chance of error, and the task is less tiring. Furthermore, with the subject apparatus the user is not fixed to a desk but can move away from the display, assume more comfortable sitting positions, and even stand and walk about in the vicinity of the display.

As noted above, the connecting mechanism 110 allows one or both of the holders 62 or 64 and their input devices 68, 70 to be removed simply by sliding the holder off from its associated connector frame 120 or 120'. Either holder can be removed in order to change an input device mounted on another similar holder that would then replace the holder and input device removed. Furthermore, under some circumstances it may be desirable to place an input device on the desktop in which event the holder can be removed from the connector and positioned on the desk in the conventional manner. Once again, as contrasted with the single hand, hand-held input devices, this apparatus allows for the holding of multiple input devices.

Although the subject apparatus 50 has been described with references to its use in inputting data, such as words and numbers, into a computer system, the apparatus is not so limited in use. It has been variously alluded to in the preceding description that "inputting data" also means inputting controls or signals, that is, data in a broader sense. For example, the data being inputted into controlled equipment, not necessarily including a display monitor, may be motion control signals generated by relative movement of the male and female coupling units 112 and 114.

Although a preferred embodiment of the present invention has been shown and described, and alternate embodiments of various features have been described, various modifications and substitutions may be made thereto without departing from the spirit and scope of the invention. Accordingly, it is to be understood that the present invention has been described by way of illustration and not limitation.

What is claimed is:

1. A two-handed, hand-held apparatus for inputting controls to a computer, or other equipment, simultaneously using both hands of the operators comprising:

a plurality of input devices each having input means for inputting controls to a computer or other equipment by the transmission of signals to such computer or equipment, and separate handle means individually mounting the devices one upon the other so that the handle means can be simultaneously held in and between the two hands of the user with at least the thumb and little finger of each hand grasping its handle means therebetween and with at least one of the middle fingers of each hand in a position to manipulate its device, said handle means enabling movement of the handle means and devices relative to each other while being so held between a first position wherein the devices are supported by a first hand of the user with one of the devices lying face up in a position to be conveniently manipulated by the second hand of the user resting on the handle means and a second position wherein the devices are supported by the second hand of the user with another of the devices lying face up in a position to be manipulated by the first hand of the user resting on the handle means, said handle means allowing such movement between said first and second positions while the devices remain so held without requiring any appreciable bending of the user's wrists.

2. A two-handed, hand-held apparatus for inputting controls to a computer, or other equipment, using both hands of the operator, comprising:

a plurality of input devices each having input means for inputting controls to a computer or other equipment by the transmission of signals to such computer or eguipment, and handle means interconnecting the devices so that the devices can be held in and between the two hands of a user for movement between a first position wherein the devices are supported by a first hand of the user with one of the devices lying face up to be manipulated by the second hand of the user resting on the handle means and a second position wherein the devices are supported by the second hand of the user with another of the devices lying face up to be manipulated by the first hand of the user resting on the handle means;

wherein the handle means interconnects the input devices so that they can be held between the two hands of a user with said hands in palm-to-palm facing relation; and wherein the handle means pivotally interconnects the input devices for pivotal movement around an axis that is transverse to the axes of the user's arms when the devices are held as aforesaid between the user's two hands and so that said axis can rotate through an angle of approximately one hundred twenty degrees when the devices are moved between the first and second positions.

3. A two-handed, hand-held apparatus for inputting data including controls to a computer, or other equipment, using both hands of the operator, comprising:

a plurality of input devices having input elements for inputting data to a computer or other equipment by the transmission of signals to such computer or equipment, each of the input devices having a reference axis and a front and a back with the input elements located on the front;

a handle mounting each input device; and a connector interconnecting the handles with the input devices in back-to-back relation and for movement of the input devices relative to each other whereby said axes move through various angular positions including positions where the axes are coplanar with each other and positions where the axes are in X-shaped relationship to each other, and so that the handles can be held in the two hands of a user with the input elements of each device outwardly accessible for hand-engagement therewith.

4. A two-handed, hand-held apparatus for inputting data including controls to a computer, or other equipment, using both hands of the operator, comprising;

a plurality of input devices each having input means for inputting data to a computer or other equipment by the transmission of signals to such computer or equipment, each of the input devices having a front and a back with the input means located on the front;

handle means for mounting each input device; and means cooperating with the handle means for pivotally interconnecting the input devices in back-to-back relation so that the handle means can be held in the two hands of a user with the input means of each device outwardly accessible for hand-engagement therewith.

5. A two-handed, hand-held apparatus for inputting data including controls to a computer, or other equipment, using both hands of the operator, comprising:

plurality of input devices each having input means for inputting data to a computer or other equipment by the transmission of signals to such computer or equipment, each of the input devices having a reference axis and a front and a back with the input means located on the front;

handle means for mounting each input device; and means cooperating with the handle means for interconnecting the input devices in back-to-back relation and for movement of the input devices relative to each other whereby said axes move through various angular relationships to each other so that the handle means can be held in the two hands of a user with the input means of each device outwardly accessible for hand-engagement therewith, wherein the interconnecting means releasably interconnects the input devices so that each of the input devices can be separated from the interconnecting means while remaining functional as an input device.

6. A hand-held inputting apparatus, comprising:

a plurality of separate input devices for controlling equipment by the transmission of signals to the equipment;

first and second holders, each of said holders having a hand-holding portion, a hand rest, and supporting at least one of the input devices thereon and within reach of a user's fingers when the hand thereof is near or on the associated hand rest; and the holders beinig releasably mounted one upon the other so that by placing one holder in one hand of a user, both holders are supported, and the other hand of the user can be placed near or against the hand rest of the other holder while the fingers of such other hand manipulate the input device on the other holder.

7. The apparatus of claim 6, wherein the the holders are mounted so that when the holders are held between and by the left and right hands of a user and the hands are alternately turned between a first position with the right hand above the left hand and a second position with the left hand above the right hand and without changing how the holders are held in the hands, the lowermost hand supports the entire apparatus and the uppermost hand rests near or on the uppermost hand rest with the user's uppermost hand extending in a first substantially straight line from its wrist and thereby in a convenient position for manipulating the uppermost input device and with the lowermost band and arm extending along a second substantially straight line in angular relation to said first line in a convenient position for supporting the entire apparatus.

8. The apparatus of claim 6, wherein the holders are pivotally interconnected.

9. A hand-held inputting apparatus, comprising:

a plurality of input devices for controlling equipment by the transrmission of signals to the equipment;

first and second holders, each of said holders having means for supporting it in a hand of a user, means providing a hand rest, and means supporting at least one of the input devices thereon and within reach of a user's fingers when the hand thereof is near or on the associated hand rest; and means mounting the holders one upon the other so that by placing one holder in one hand of a user, both holders are supported, and the other hand of the user can be placed near or against the hand rest of the other holder while the finglers of such other hand manipulate the input device on the other holder, wherein the mounting means connects the holders for rotational movement relative to each other.

10. The apparatus of claim 9, wherein the mounting means interconnects the holders for rotation through three hundred-sixty degrees relative to each other.

11. A hand-held controller, comprising:

a plurality of input devices for controlling equipment selected from the group of equipment consisting of electrical, optical and electro-optical equipment;

separable first and second handles each having hand-holding, hand-resting, and device-supporting portions;

at least one of the input devices being supported on the supporting portion of each handle in a position to be manipulated by the fingers of a user's hand while it is near or against the hand-resting portion of the respective handle; and the handles being releasably interconnected so that when the hand-holding portions are individually held by and between the two hands of a user, one of the hands can support both handles while the other hand can rest on the hand-resting portion of the other handle and its fingers can manipulate the input device on the other handle.

12. A two-handed, hand-held apparatus for mounting input devices that control the transmission of signals to equipment to-be-controlled, comprising:

first and second housings each having an exterior and an interior;

hand-operated input devices mounted on the exterior of each housing, each of the housings having means for enabling it to be held in the hand of a user in such a way that the hand can reach and manipulate the device mounted thereon;

means in each housing for generating and transmitting signals from the housings in response to manipulation of the device on the housing; and means interconnecting the housings for pivotal movement relative to each other when one housing is held in one hand of a user and the other housing is held in the other hand of the user and the housings are pivoted back and forth relative to each other between a first position wherein the first housing and its input device are on top of the second housing and a second position wherein the second housing and its input device are on top of the first housing, whereby the input device selected for the top position is in a convenient position for manipulation.

13. A hand-held input apparatus, comprising a pair of elongated hand-held housings of substantially uniform size and shape each having front and back portions and longitudinally spaced hand-resting and mounting areas on the front portion;

signal generators mounted in the housings;

a hand-operated input device supported on the mounting area of each housing in a position to be manipulated by a user's hand on the adjacent hand-resting area, each of said devices being capable of causing signals to be transmitted from the signal generator in its housing upon manipulation of the device; and the housings being pivotally interconnected in back-to-back relation for movement relative to each other about an axis extending through the housings transversely of the longitudinal dimensions thereof.

14. The apparatus of claim 13, wherein there is a connector releasably interconnecting the housings whereby the housings can be separated from each other.

15. The apparatus of claim 13 wherein the connector includes:

a pair of overlapping frames circumscribing a common center and being individually releasably connected to the housings, and a pivot mechanism interconnecting the frames for rotation about an axis passing through said center.

16. The apparatus of claim 15, wherein the pivot mechanism includes:

a coupling mounted on one of the frames having a groove defining a circular path concentric to said axis, and a coupling disc mounted on the other frame and rotatably slidably received in the groove and being constrained thereby for rotation about said axis, whereby the housings are interconnected for rotation about said axis upon rotation of the disc in the groove.

17. A two-handed, hand-held apparatus for mounting input devices that control the transmission of signals to equipment to-be-controlled, comprising:

a pair of elongated wedge-shaped housings of substantially uniform size and shape each having opposite ends, a planar back surface, a front surface lying in a plane inclined relative to the back surface, said front surface providing a mounting area at one end thereof and a hand rest extending from the mounting area toward the other end thereof, the back surface providing a pair of elongated longitudinally extending, transversely spaced slots and a rectangular recess between the slots, the housings being disposed in back-to-back relation with their back surfaces parallel to each other so that one of the input devices is right-side up and the other input device is upside down;

a hand-operated input device supported on the mounting area of each housing in a position to be manipulated by a user's hand on or near the adjacent hand-rest;

a pair of rectangular connector frames individually disposed in the recesses and having longitudinally extending side rails individually slidably releasably received in the slots of their respective housings;

arcuate coupling shoes mounted on one of the frames having arcuate grooves defining a circular path concentric to an axis of rotation extending through the housings transversely thereof; and a coupling disc mounted on the other frame and rotatably received in the grooves of the shoes, whereby the housings are interconnected for rotation about said axis so that by holding the housings in and between the two hands of a user, the input devices can be selectively placed right side up for convenient manipulation by the hand of a user resting on the hand-rest of the uppermost housing while the other hand supports both of the housings.

18. A connecting mechanism for interconnecting a pair of hand-held holders for mounting and manipulating input devices that are used to transmit information to equipment in order to operate the equipment, comprising:

a pair of elongated, rectangular frames each having a center, opposite ends and a pair of transversely spaced elongated side bars adapted to be connected to an input device holder, said frames being disposed in overlapping relation with their centers lying on a common axis;

a male coupling member mounted on one of the frames; and a female coupling member mounted on the other frame and rotatably receiving the male coupling member so that the coupling members and their connected frames can rotate about said axis.

19. The connecting mechanism of claim 18, wherein there are U-shaped supporting guides individually attached to the frames in slidable engagement with each other as the frames are rotated about said axis.

20. The connecting mechanism of claim 19, wherein the female coupling member includes an arcuate stationary shoe and an arcuate movable shoe both concentric to said axis, and wherein the female coupling member, said other frame, and the guides mount the movable shoe for movement toward and away from the stationary shoe to enable placement of the male coupling member between the shoes when the shoes are spaced a predetermined distance apart and to capture the male coupling member between the shoes when the movable shoe is positioned closer to the stationary shoe than said predetermined distance.

21. The connecting mechanism of claim 20, wherein the side bars have outer elongated side rails and inner elongated tracks;

wherein the shoes are mounted on the tracks; and wherein the holders having slots slidably receiving the rails.

22. The connecting mechanism of claim 20, wherein there is an adjusting rod mounted in one of the frames and engageable with the movable shoe for moving it toward and away from the stationary shoe.

23. The connecting mechanism of claim 18, wherein the male coupling member is a disc.

24. The connecting mechanism of claim 23, wherein the disc has an aperture therein, wherein said one frame has a cross bar interconnecting the side bars, and wherein a lug projector from the cross bar into said aperture to connect said one frame to the disc.

25. The connecting mechanism of claim 20, wherein the frames are symmetrical and in face-to-face relation for movement into congruent overlying relation upon rotational movement of the frames;

wherein the guides are symmetrical and sandwiched between the frames; and wherein the coupling member and the shoes are disposed within the guides.

26. The connecting mechanism of claim 25, wherein there are lugs on the frames in slidable engagement with each other when the frames are in congruent relation.

27. A method of controlling equipment with a two-handed, hand-held apparatus which mounts a plurality of control devices for rotational movement relative to each other, comprising:

holding the control devices in and between both hands with the longitudinal axes of the user's arm in angular relation to each other and with the fingers of each hand disposed over a control device in a position to manipulate the device, rotating the hands about said longitudinal axes of their respective arms in the same clockwise or counterclockwise direction and without appreciable bending of the wrists to rotate the devices and place them in various selected positions including positions wherein one device is above the other and side-by-side positions thereby to place one or both devices in the most convenient position for manipulation by the user, and manipulating the devices alternately or simultaneously in said selected positions.

28. A method of inputting data into a computer or other electronic or electro-optical equipment with a two-handed, hand-held apparatus providing a plurality of input devices interconnected for movement relative to each other, comprising:

holding the input devices in and between both hands with the fingers of each hand disposed over an input device in a position to manipulate the device, rotating the hands in the same clockwise or counterclockwise direction to place one device in an uppermost position relative to the other device, supporting both devices in the lowermost hand, and manipulating said one device with the uppermost hand;

wherein the input devices are pivotally interconnected, wherein the rotating step involves pivoting the input devices through a selected angle relative to the respective longitudinal axes of the user's arms.

29. The method of claim 28 wherein said angle is about one hundred eighty degrees.

30. A hand-held inputting apparatus comprising:

first and second handles each including a hand-grasping portion, a hand-resting portion, and a device-mounting portion;

an input device mounted on the device mounting portion of each handle, said input device being capable of transmitting signals for controlling equipment, and a pivot interconnecting the handles and mounting one handle upon the other with the hand-resting portions and the device-mounting portions disposed outwardly of the handles, said pivot interconnecting the holders so that they can be rotated when the hand-grasping portions of the handles are individually grasped in the left and right hands of the user and the user rotates his or her arms about their longitudinal axes thereby alternatively to position one input device on top of the other.

31. A hand-held inputting apparatus adapted to be operated using both hands of a user comprising:

a pair of handles each having a front portion and a back portion and a longitudinal axis and hand-holding portions capable of being held individually in the two hands of a user so that the longitudinal axis of each handle is generally in alignment with the longitudinal axis of the arm of the hand that holds the handle;

a connector interconnecting the handles in back-to-back relation so that the front portions are disposed outwardly and so that the longitudinal axes can be moved into and out of X-shaped relation;

an input device mounted on the front portion of each handle, said connector enabling the handles to be moved through separate arcuate paths between a first position with one of the input devices facing upwardly under the right hand of the user and a second position with the other input device facing upwardly under the left hand of the user while the handles are held in the two hands of the user with said axes remaining in general alignment with the longitudinal axes of the user's respective arms holding the handles.

32. A two-handed, hand-held apparatus for mounting input devices, comprising:

first and second housings;

a hand-operated input device mounted on each housing, each of the housings having a hand-holding portion enabling it to be held in the hand of a user in such a way that the hand can reach and manipulate the input device mounted thereon;

a signal generator in each housing responsive to the input device thereon; and a pivot interconnecting the housings for pivotal movement relative to each other when one housing is held in one hand of a user and the other housing is held in the other hand of the user and the housings are pivoted back and forth relative to each other between a first position wherein the first housing and its input device on top of the second housing and a second position wherein the second housing and its input device are on the top of the first housing, whereby the input device selected for the top position is in a convenient position for manipulation.

* * * * *